(12) United States Patent
Suzuki

(10) Patent No.: US 10,038,874 B2
(45) Date of Patent: Jul. 31, 2018

(54) INFORMATION PROCESSING APPARATUS, DISPLAY CONTROL METHOD, AND PROGRAM

(71) Applicant: Sony Corporation, Tokyo (JP)

(72) Inventor: Seiji Suzuki, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/892,851

(22) PCT Filed: May 15, 2014

(86) PCT No.: PCT/JP2014/002564
§ 371 (c)(1),
(2) Date: Nov. 20, 2015

(87) PCT Pub. No.: WO2014/192239
PCT Pub. Date: Dec. 4, 2014

(65) Prior Publication Data
US 2016/0182854 A1    Jun. 23, 2016

(30) Foreign Application Priority Data

May 30, 2013 (JP) ................................ 2013-114007

(51) Int. Cl.
H04N 5/445 (2011.01)
H04N 7/14 (2006.01)
(Continued)

(52) U.S. Cl.
CPC ............ *H04N 7/141* (2013.01); *H04N 7/147* (2013.01); *H04N 13/04* (2013.01);
(Continued)

(58) Field of Classification Search
USPC ........................................... 348/14.01–14.09
See application file for complete search history.

(56) References Cited

U.S. PATENT DOCUMENTS 8,451,994 B2 * 5/2013 Abuan .................. H04N 7/147
379/102.01
8,744,420 B2 * 6/2014 Cranfill .................. H04N 7/147
348/14.01
(Continued)

FOREIGN PATENT DOCUMENTS

CN          102598677 A    7/2012
JP            1123390 A    5/1995
(Continued)

OTHER PUBLICATIONS

International Search Report from International Publication PCT/JP2014/002564 dated Oct. 9, 2014.
(Continued)

*Primary Examiner* — Maria El-Zoobi
(74) *Attorney, Agent, or Firm* — Lerner, David, Littenberg, Krumholz & Mentlik, LLP

(57) ABSTRACT

An information processing apparatus may include a control device to control switching between a first display state and a second display state according to a trigger operation that is a specific operation of a user, wherein the trigger operation is based on operation information indicating an operation performed by the user.

13 Claims, 10 Drawing Sheets

(51) Int. Cl.
*H04N 21/4223* (2011.01)
*H04N 21/431* (2011.01)
*H04N 21/442* (2011.01)
*H04N 21/4788* (2011.01)
*H04N 13/04* (2006.01)

(52) U.S. Cl.
CPC ..... *H04N 21/4223* (2013.01); *H04N 21/4316* (2013.01); *H04N 21/44218* (2013.01); *H04N 21/4788* (2013.01); *H04N 7/142* (2013.01)

(56) References Cited

U.S. PATENT DOCUMENTS

| | | |
|---|---|---|
| 2010/0085416 A1 | 4/2010 | Hegde et al. |
| 2011/0109619 A1* | 5/2011 | Yoo .................... G06T 17/00 345/419 |
| 2011/0154266 A1 | 6/2011 | Friend et al. |
| 2011/0242269 A1* | 10/2011 | Nothlings ............. H04N 5/45 348/14.05 |
| 2012/0023531 A1* | 1/2012 | Meuninck .......... H04N 21/4334 725/100 |
| 2012/0327174 A1 | 12/2012 | Hines et al. |
| 2013/0060926 A1 | 3/2013 | Kato et al. |
| 2014/0002581 A1* | 1/2014 | Bear ..................... H04N 5/445 348/14.07 |

FOREIGN PATENT DOCUMENTS

| | | |
|---|---|---|
| JP | 3237629 A | 9/1996 |
| JP | H08237629 | 9/1996 |
| JP | 11122594 A | 4/1999 |
| JP | H11122594 A | 4/1999 |
| JP | 2004054134 A | 2/2004 |
| JP | 2006165763 A | 6/2006 |
| JP | 2008294815 A | 12/2008 |
| JP | 201123883 A | 2/2011 |
| JP | 2011-077710 A | 4/2011 |
| JP | 2012068991 A | 4/2012 |
| JP | 2013016123 A | 1/2013 |
| JP | 2013055403 A | 3/2013 |
| JP | 2013514585 A | 4/2013 |
| WO | 2010103717 A1 | 9/2010 |
| WO | 2012117652 A1 | 9/2012 |

OTHER PUBLICATIONS

Japanese Office Action for Application No. 2013114007 dated Feb. 14, 2017.
Japanese Office Action for Application No. 2013114007 dated May 9, 2017. (Google generated translation attached.).
Chinese Office Action for Application No. 201480029853.6 dated Mar. 22, 2018.

\* cited by examiner

[Fig. 1]
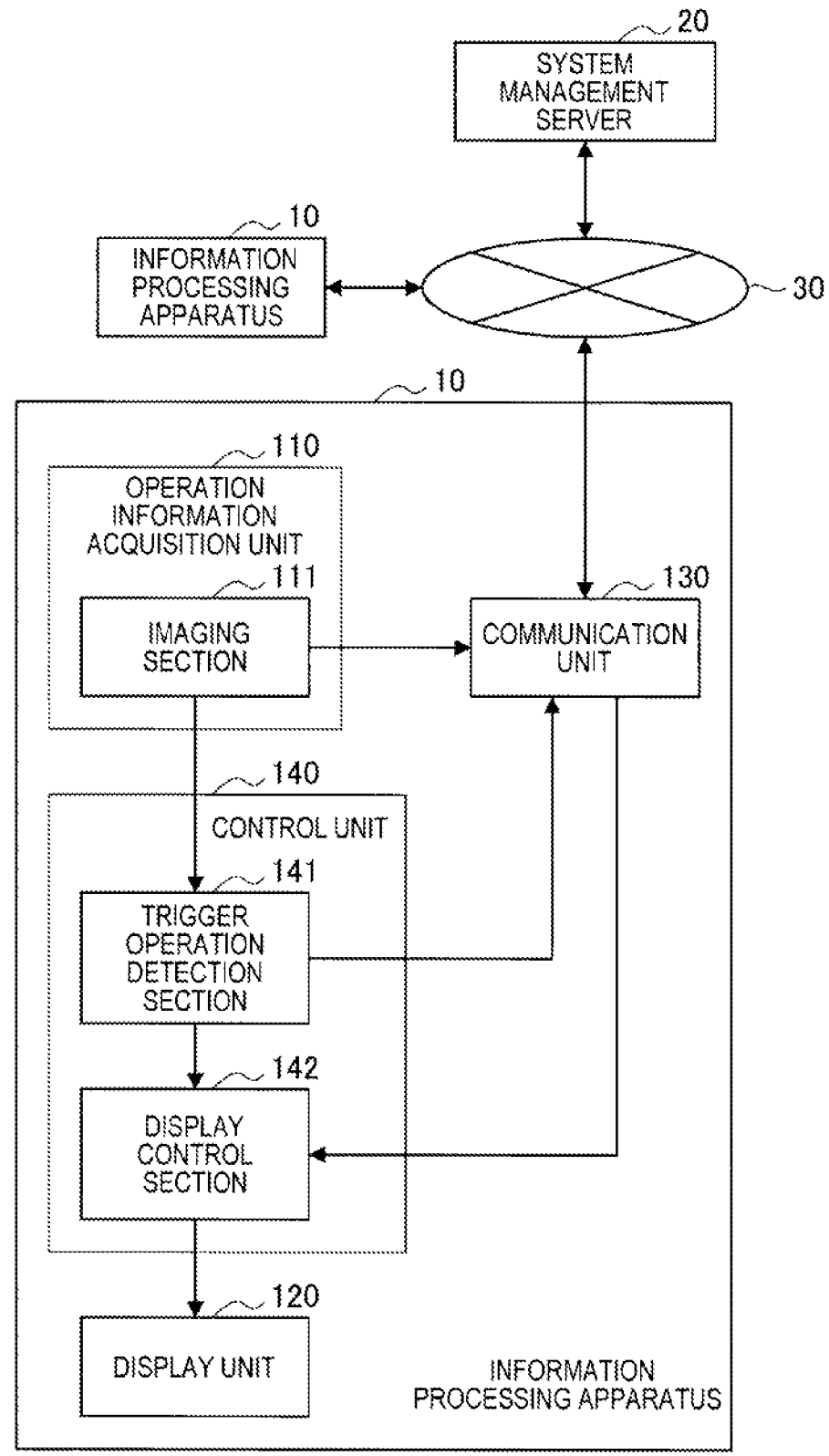

[Fig. 2A]
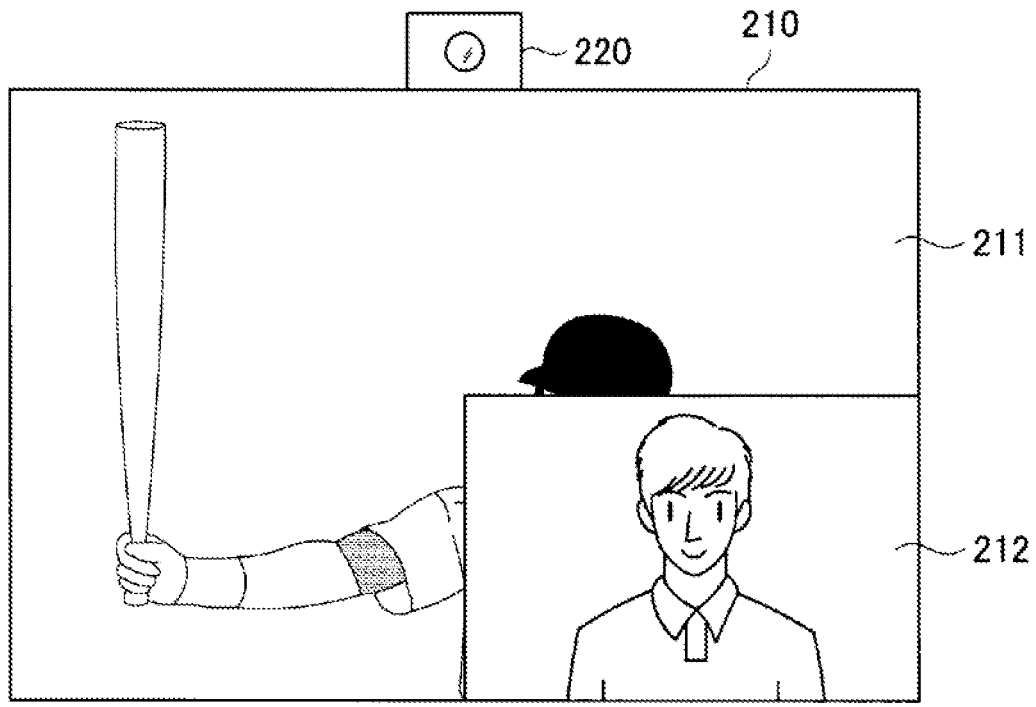
[Fig. 2B]
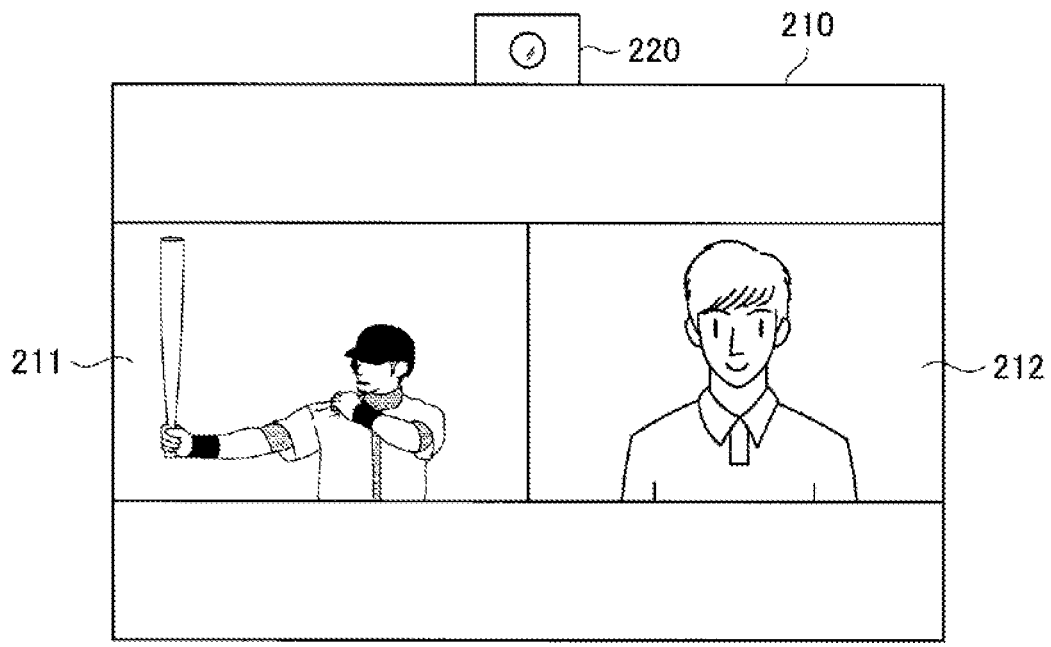

[Fig. 3A]
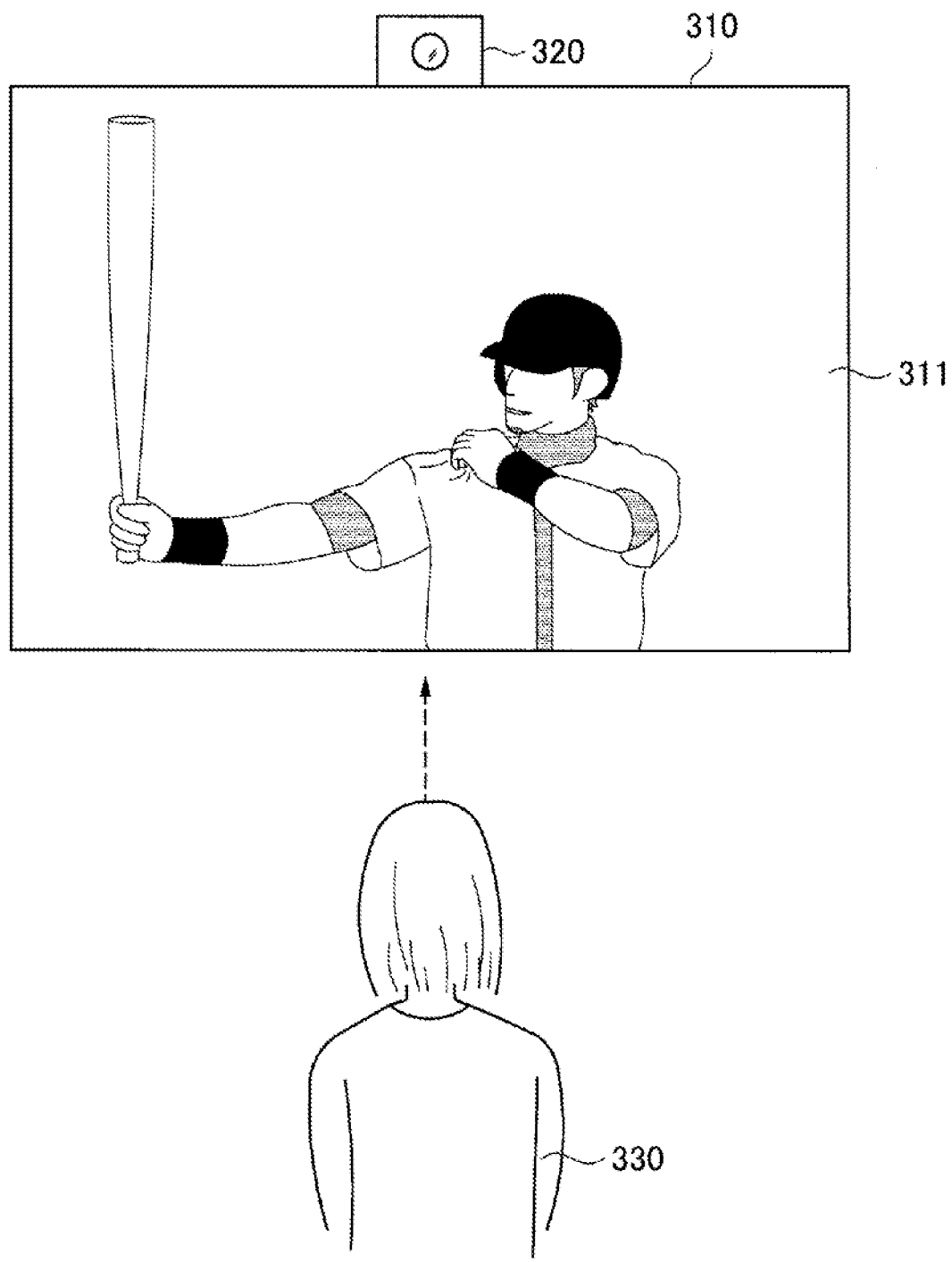

[Fig. 3B]
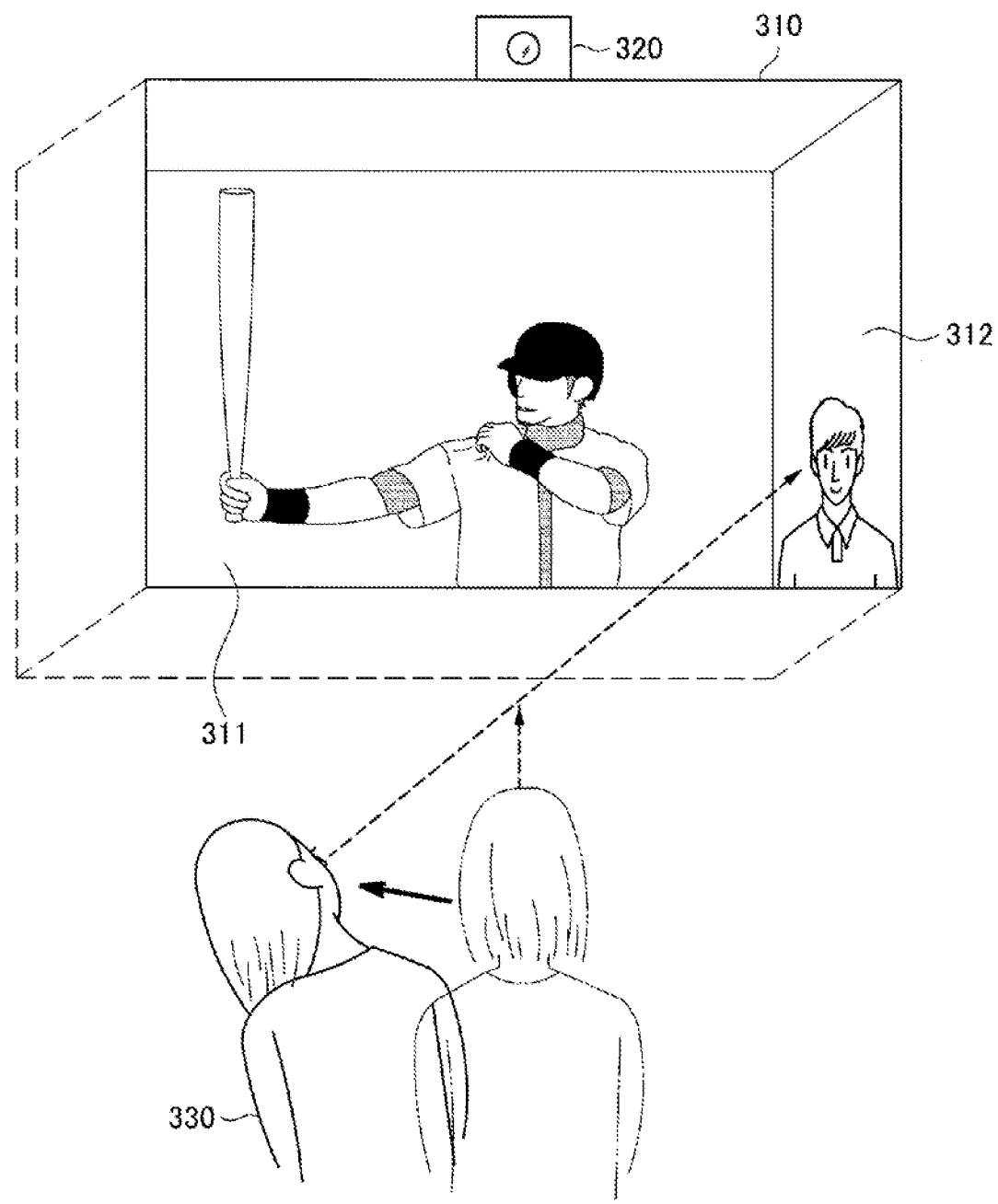

[Fig. 3C]
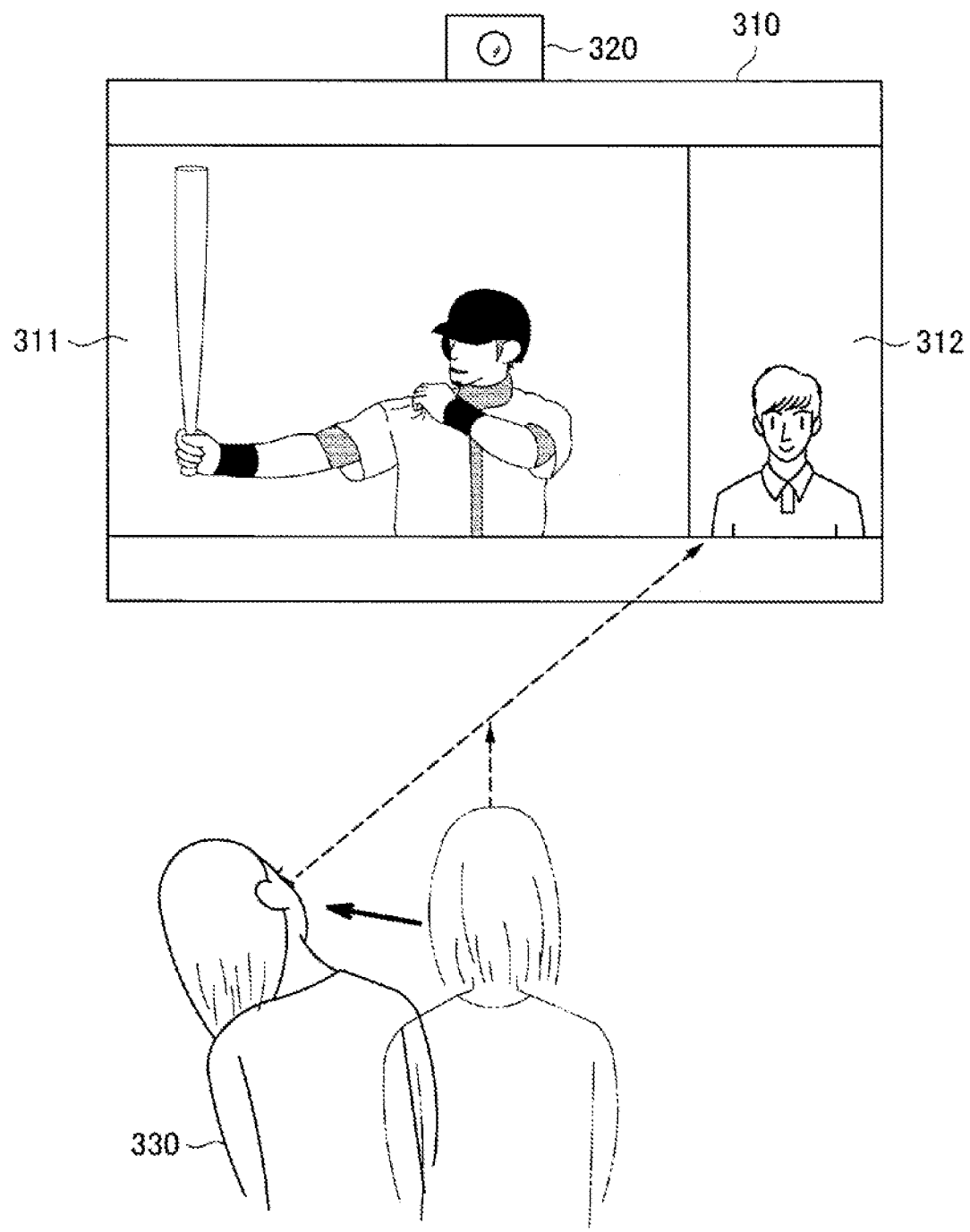

[Fig. 4A]
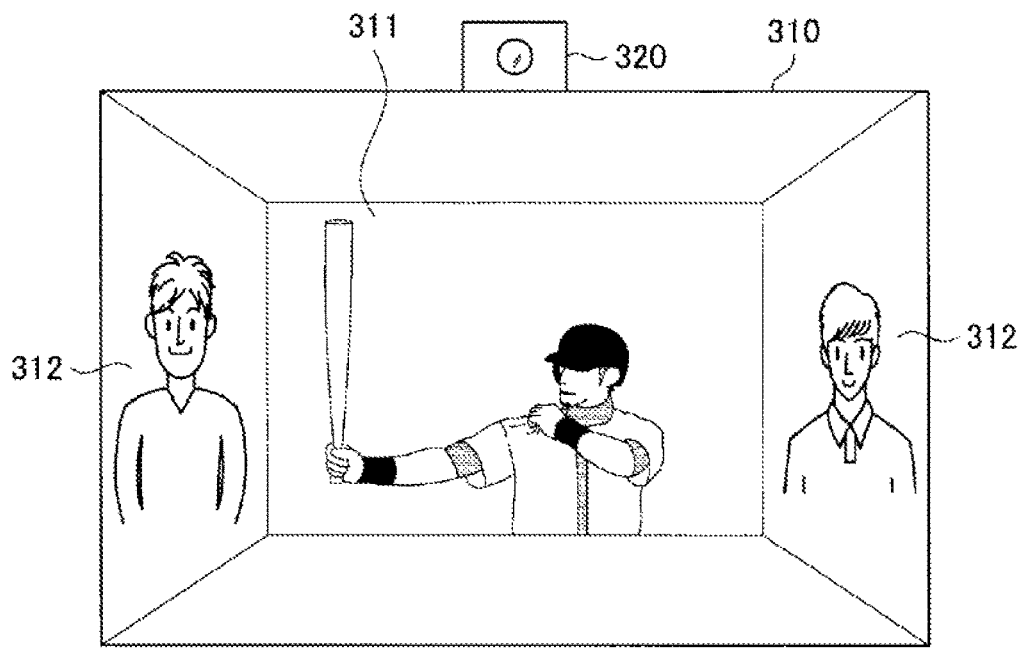
[Fig. 4B]
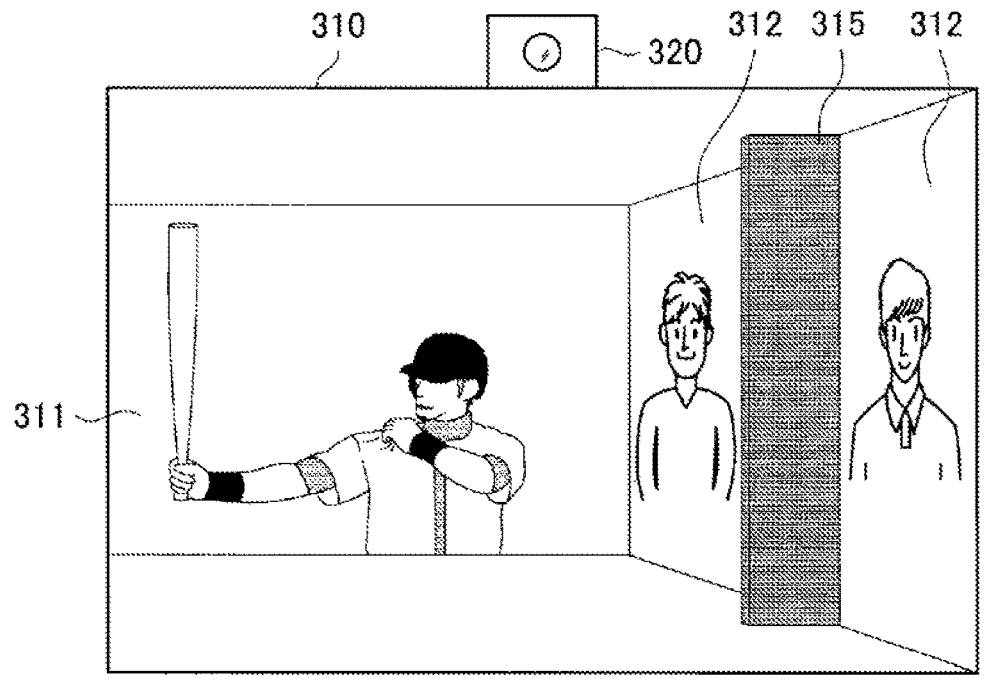

[Fig. 5]
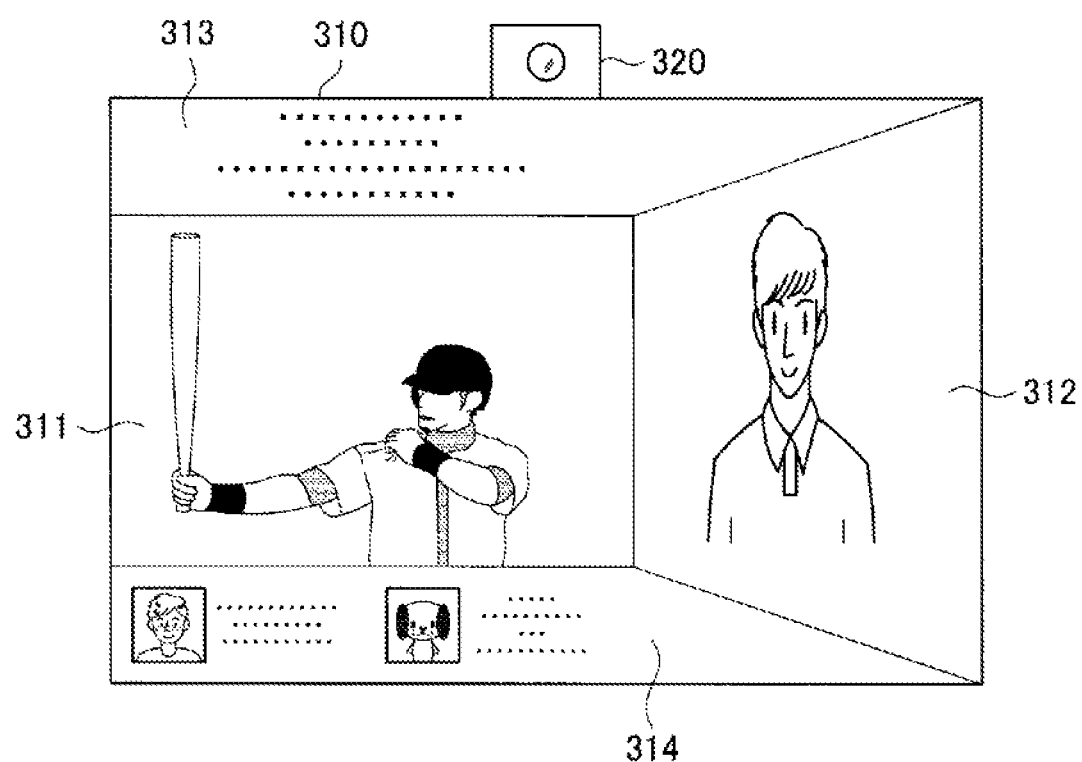

[Fig. 6]
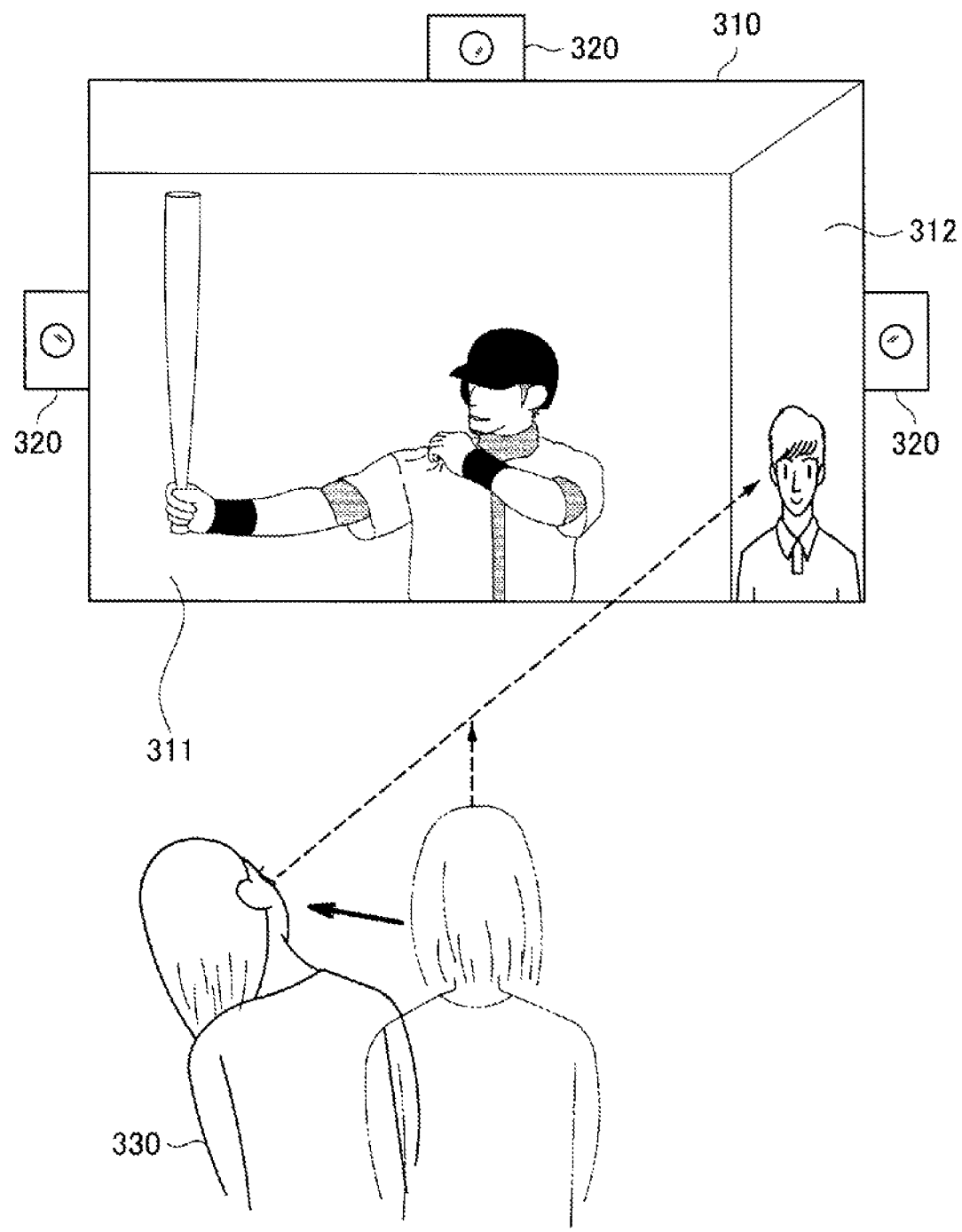

[Fig. 7]
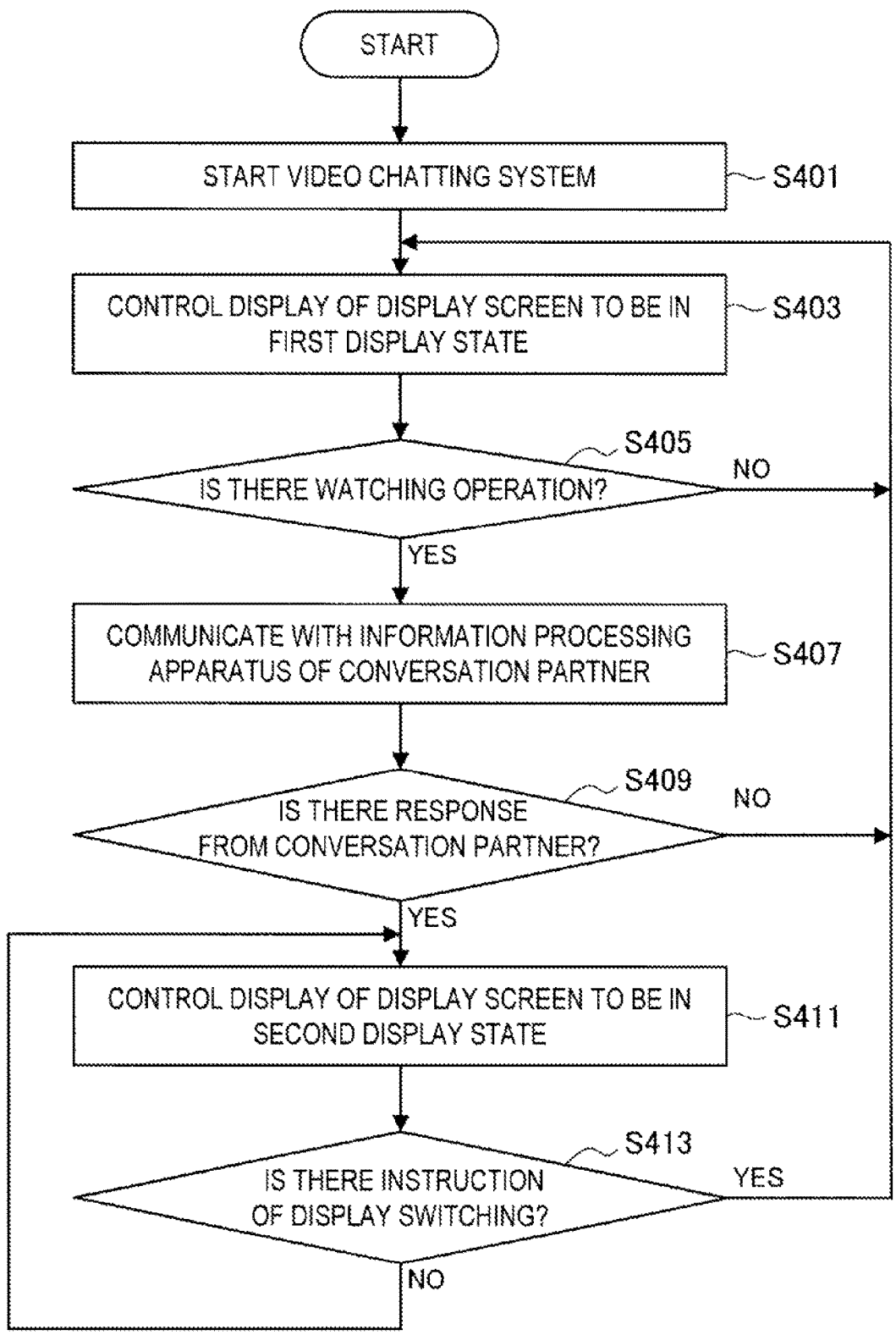

[Fig. 8]
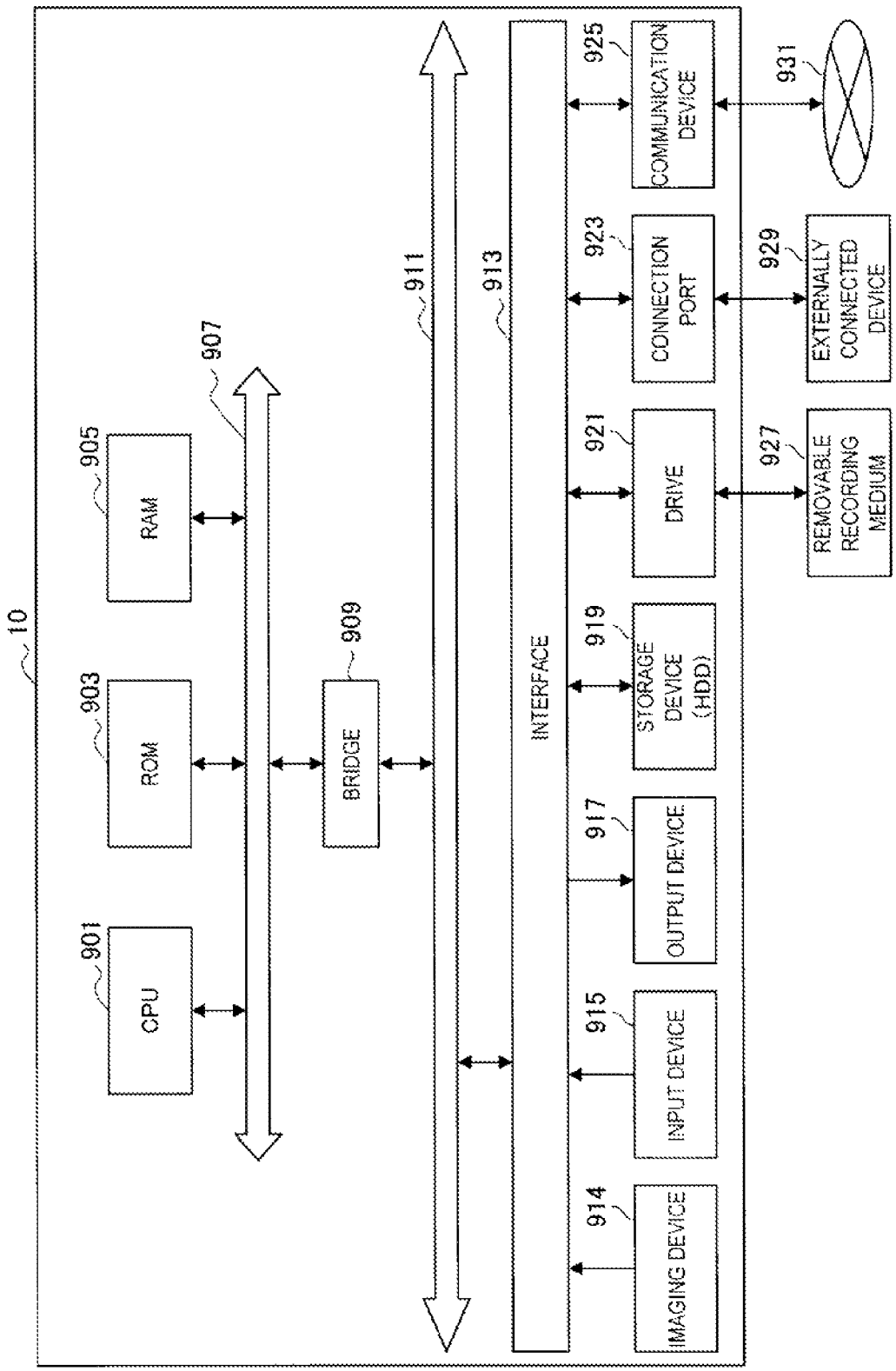

INFORMATION PROCESSING APPARATUS, DISPLAY CONTROL METHOD, AND PROGRAM

CROSS-REFERENCE TO RELATED APPLICATIONS

The present application is a national phase entry under 35 U.S.C. § 371 of International Application No. PCT/JP2014/002564 filed May 15, 2014, published on Dec. 4, 2014 as WO 2014/192239 A1, which claims priority from Japanese Priority Patent Application No. JP 2013-114007 filed in the Japanese Patent Office on May 30, 2013, the entire contents of which are incorporated herein by reference.

TECHNICAL FIELD

The present disclosure relates to an information processing apparatus, a display control method, and a program.

BACKGROUND ART

Recently, a video telephone system (video chatting system) in which users can converse on the phone while seeing the faces of their partners has been generally used with convenience using a personal information processing terminal such as a PC (Personal Computer). In order to realize comfortable communication with conversation partners in the video chatting system, technologies of displaying images of the contacting partners to users as if the users were speaking to the conversation partners face-to-face have been proposed. For example, PTL 1 proposes a technology of displaying, on a display screen for a user, an image of a conversation partner in which depth of the display screen and depth of a direction of a line of sight of the user are reflected according to a change in the line of sight (a position of the eyes) of the user.

CITATION LIST

Patent Literature

[PTL 1]
JP 2011-77710A

SUMMARY

Technical Problem

On the other hand, in recent years, an enjoyable way of simultaneously executing a plurality of applications in an information processing apparatus such as a PC has become widespread. For example, an enjoyable way of performing video chatting while viewing other content (for example, a television program distributed from a broadcasting station or the like) in a video chatting system has been proposed.

Here, when the plurality of applications are simultaneously executed, a plurality of pieces of content relating to the applications are displayed on a display screen, and thus a high level of freedom in user control of display has been demanded in view of user convenience. In the example of the video chatting described above, for example, it is desirable to control display of the display screen such as switching the display if necessary by displaying both of other content and a captured image of a conversation partner of video chatting or displaying only one of the content and the image in a manner that is simpler for the user. PTL 1 described above neither mentions such a case in which video chatting is performed while other content is viewed, nor discusses user convenience in the display control when a plurality of different pieces of content are displayed on a display screen.

Therefore, further improvement of user convenience in display control when a plurality of different pieces of content are displayed on a display screen has been desired. The present disclosure proposes a novel and advanced information processing apparatus, display control method, and program that can further improve user convenience.

Solution to Problem

According to an embodiment of the present disclosure, an information processing apparatus may include a control device to control switching between a first display state and a second display state according to a trigger operation that is a specific operation of a user, wherein the trigger operation is based on operation information indicating an operation performed by the user.

According to an embodiment of the present disclosure, an information processing method may include controlling, by a control device, switching between a first display state and a second display state according to a trigger operation that is a specific operation of a user, wherein the trigger operation is based on operation information indicating an operation performed by the user.

According to an embodiment of the present disclosure, a non-transitory recording medium may be recorded with a program executable by a computer, and the program may include controlling switching between a first display state and a second display state according to a trigger operation that is a specific operation of a user, wherein the trigger operation is based on operation information indicating an operation performed by the user.

Advantageous Effects of Invention

According to an embodiment of the present disclosure described above, it is possible to further improve user convenience.

BRIEF DESCRIPTION OF DRAWINGS

FIG. 1 is a functional block diagram illustrating a configuration example of a display control system and an information processing apparatus according to an embodiment of the present disclosure.

FIG. 2A is a brief diagram schematically illustrating an example of a display screen in an existing general display control process.

FIG. 2B is a brief diagram schematically illustrating an example of a display screen in an existing general display control process.

FIG. 3A is a brief diagram schematically illustrating an example of a display screen in a display control process when a trigger operation is a watching operation.

FIG. 3B is a brief diagram schematically illustrating an example of a display screen in a display control process when a trigger operation is a watching operation.

FIG. 3C is a brief diagram schematically illustrating an example of a display screen in a display control process when a trigger operation is a watching operation.

FIG. 4A is a brief diagram schematically illustrating an example of the display screen in the display control process when there are a plurality of conversation partners in video chatting.

FIG. 4B is a brief diagram schematically illustrating an example of the display screen in the display control process when there are a plurality of conversation partners in video chatting.

FIG. 5 is a brief diagram schematically illustrating an example of the display screen in the display control process when a plurality of different pieces of second content are displayed in a second display state.

FIG. 6 is an illustrative diagram for describing a correction process of display of a user and a conversation partner in the second display state.

FIG. 7 is a flowchart showing an example of a processing procedure of a display control method according to an embodiment of the present disclosure.

FIG. 8 is a brief diagram showing a hardware configuration of the information processing apparatus according to an embodiment of the present disclosure.

DESCRIPTION OF EMBODIMENTS

Hereinafter, exemplary embodiments of the present disclosure will be described in detail with reference to accompanying drawings. It should be noted that, in the present specification and the drawings, overlapping description will be avoided by giving the same reference numerals to constituent elements that have substantially the same functional configurations.

Note that description will be provided in the following order.
1. Configuration of a display control system and an information processing apparatus
2. Specific example of a display control process
2-1. Existing general display control process
2-2. Display control process according to a present embodiment
2-2-1. Display control using a watching operation
2-2-2. Display of a plurality of pieces of second content
2-2-3. Display of a plurality of different pieces of content
2-2-4. Correction of display of a user and a conversation partner
3. Processing procedure of a display control method
4. Hardware configuration
5. Conclusion CONFIGURATION OF A DISPLAY CONTROL SYSTEM AND AN INFORMATION PROCESSING APPARATUS In an embodiment of the present disclosure, display control of a display screen is performed in a situation in which a plurality of different pieces of content can be displayed. To be specific, in the present embodiment, a trigger operation that is a specific operation of a user performed with respect to the display screen is detected based on operation information that is information of an operation performed by the user. Then, the display control of switching a first display state in which first content is displayed and second content relating to the first content is not displayed on the display screen and a second display state in which the first content and the second content are at least displayed on the display screen is performed according to the detected trigger operation. In description that will be provided hereinbelow, a series of processes of the present embodiment which at least include the above-described processes will be called a display control process.

First, a configuration example of a display control system for realizing the display control process according to the present embodiment will be described. Note that, in description below, the display control process of a display screen when video chatting is performed while other content (for example, a television program distributed from a broadcasting station or the like) is viewed will be described exemplifying a video chatting system. In addition, a plurality of different pieces of content displayed on the display screen during video chatting are assumed to be, for example, other content such as the television program (hereinafter also referred to as first content) and captured images (hereinafter also referred to as second content) of users (a user and a conversation partner) of the video chatting. Therefore, in the display control process according to the present embodiment, when the video chatting system is used, switching is performed between the first display state in which other content that is the first content is displayed and a captured image of a conversation partner of the video chatting that is the second content is not displayed and a second display state in which the other content and the captured image of the conversation partner are at least displayed. Since the first content and the second content can be displayed on the display screen when the video chatting is used, both can be said to be mutually relevant content. However, the display control process according to the present embodiment is not limited to the display control of the display screen when the video chatting system is used, and the process can also be applied to uses of other systems and applications as long as the process relates to display control for switching display of a plurality of different pieces of content on a display screen. In addition, the first content and the second content are not limited to the above-described example, and content displayed on a display screen may be any content such as images, videos, and text.

A configuration example of a display control system for realizing the display control process according to the present embodiment and an information processing apparatus constituting the display control system will be described with reference to FIG. 1. FIG. 1 is a functional block diagram illustrating the configuration example of the display control system and the information processing apparatus according to the embodiment of the present disclosure.

Retelling to FIG. 1, the display control system 1 according to the present embodiment is configured such that a plurality of information processing apparatuses 10 and a system management server 20 are connected to one another via a communication network (network) 30 so as to communicate (transmit and receive) various kinds of information with one another.

The system management server 20 is a server that comprehensively manages and controls various kinds of information and processes in the video chatting system. Here, the video chatting system refers to a system in which a user of the information processing apparatus 10 and at least one or more conversation partners can transmit and receive information of captured images in which the user and the conversation partners are photographed and information of voices emitted from the user and the conversation partners via the information processing apparatuses 10 at least between them, and is a so-called video telephone system. For example, the system management server 20 performs various processes of managing account information (ID information, password information, and the like) of the users of the video chatting system, connection and disconnection of video chatting between the users, and the like. Furthermore, the system management server 20 can perform various processes that would be performed by system management servers of generally known video chatting systems. In description that will be provided hereinbelow, with regard to various kinds of information exchanged between the user and the conversation partners via the information processing apparatuses 10 in the video chatting system, various kinds of information that relate to images including the captured images in which the user and the conversation partners are photographed are also called video information, and various kinds of information that relate to voices including voices emitted by the user and the conversation partners are also called voice information.

The information processing apparatus 10 is an information processing terminal, for example, a PC of the like, and is a terminal for performing video chatting under control of the system management server 20. For example, an individual account is allocated to each information processing apparatus 10 in the video chatting system. Based on the account, a plurality of information processing apparatuses 10 authenticated by the system management server 20 are connected thereto so that video information and voice information can be transmitted and received, and thereby video chatting between the plurality of information processing apparatuses 10 is possible.

The example shown in FIG. 1 illustrates that two information processing apparatuses 10 are connected to each other via a network 30 for simplification. In description below, both users in video chatting are discriminated by referring to a user who uses one information processing apparatus 10 as a user A and the other user who uses the other information processing apparatus 10 as a user B for the sake of convenience. In addition, hereinbelow, the display control process according to the present embodiment will be described mainly from the viewpoint of the user A, however, the various processes performed in the information processing apparatus 10 of the user A may be performed also in the information processing apparatus 10 of the user in the same manner B. Furthermore, in description below, the user A is also referred to simply as a "user" and the user B as a "conversation partner."

A configuration of the information processing apparatus 10 will be described in detail. Referring to FIG. 1, the information processing apparatus 10 according to the present embodiment is provided with an operation information acquisition unit 110, a display unit 120, a communication unit 130, and a control unit 140. Note that, in FIG. 1, while only a configuration of the one information processing apparatus 10 (for example, the information processing apparatus 10 of the user A) is illustrated in detail and a detailed configuration of the other information processing apparatus 10 (for example, the information processing apparatus 10 of the user B) is not illustrated for the sake of simplification, the information processing apparatuses 10 have the same configuration. Herein, the configuration will be described exemplifying the information processing apparatus 10 of the user A.

The operation information acquisition unit 110 acquires operation information that is information of operations performed by the users. Here, the operation information may include any kind of information as long as it relates to operations performed by the users. For example, the operation information can include information of motions of at least a part of the body of a user (hereinafter, also referred to simply as motions of a user), information of voices emitted by a user, and the like.

A method of the operation information acquisition unit 110 for acquiring the operation information will be described in detail. In the present embodiment, the operation information acquisition unit 110 has an imaging section 111 that photographs images of imaging targets.

The imaging section 111 is an imaging part such as a camera that can photograph imaging targets in the form of still images, moving images, and the like. In the present embodiment, an imaging target of the imaging section 111 is the user of the information processing apparatus 10, and the imaging section 111 is disposed in a position in which an image that at least includes a motion of the user can be photographed. To be specific, when using video chatting, the user is expected to be positioned in a place in which he or she can face the display screen of the display unit 120, and thus the imaging section 111 is disposed in, for example, an upper portion of the display screen, or the like so that the space in which the imaging section faces the display screen is formed as a photographing range.

The operation information acquisition unit 110 can acquire operation information of the user by acquiring information of motions of at least a part of the body of the user based on a captured image photographed by the imaging section 111. To be specific, the operation information acquisition unit 110 can extract, from, for example, moving images or consecutive images photographed by the imaging section 111, a motion vector that indicates a movement of an object in the images, and then acquire information of motions of the user (for example, a direction of a motion or a movement amount of the user) based on the motion vector. Note that a method of the operation information acquisition unit 110 for acquiring information of motions of the user based on captured images is not limited to the method of using a motion vector, and various known methods of detecting a movement of an object in an image through image analysis may be used.

In addition, the operation information acquired by the operation information acquisition unit 110 may include not only information of motions of the whole body of the user but also motions of a part of the body of the user. For example, the operation information can include motions of each part of the body of the user such as motions of the hands and fingers, motions of the head, or motions of the eyeballs (in other words, motions of the line of sight) of the user.

Note that, although the example shown in FIG. 1 described that the operation information acquisition unit 110 has the imaging section 111 and the operation information of the user is acquired based on captured images photographed by the imaging section 111, the present embodiment is not limited to the example. The operation information acquisition unit 110 may have configurations other than the imaging section 111, and may acquire the operation information based on information acquired by such configurations. For example, the operation information acquisition unit 110 may acquire the operation information by having a distance-measuring sensor device such as an infrared sensor device, or an ultrasonic sensor device, thereby acquiring information of motions of the riser based on a distance to the user measured by the distance-measuring sensor device. In addition, the operation information acquisition unit 110 may have the imaging section 111 and the distance-measuring sensor device together thereby acquiring information of motions of the user based on captured images and a distance to the user. The operation information acquisition unit 110 can acquire information of motions of the user using any other known motion detection methods. In this manner, as the operation information acquisition unit 110 acquires information of motions of the user by combining a plurality of motion detection methods, accuracy in information of motions of the user in the operation information can be enhanced.

In addition, as described above, the operation information may include information of voices emitted by the user and the like. The operation information acquisition unit 110 can have a sound-collecting device, for example, a microphone device or the like, and thus can acquire the operation information by acquiring information of a voice of the user using the sound-collecting device. The operation information may be an operation of a user, for example, of emitting a voice including a specific word.

The operation information of the user acquired by the operation information acquisition unit 110 is transmitted to a trigger operation detection section 141 of the control unit 140 which will be described later. In addition, information of the captured images photographed by the imaging section 111 and/or information of voices collected by the sound-collecting device may be transmitted to the communication unit 130, and then transmitted to the information processing apparatus 10 of the conversation partner via the network 30 by the communication unit 130 as video information and/or voice information exchanged in video chatting.

In other words, in the present embodiment, the information of the captured images photographed by the imaging section 111 may be transmitted to the information processing apparatus 10 of the conversation partner as the video information in the video chaffing, and then the captured images may be displayed on the display screen of the information processing apparatus 10 of the conversation partner. In addition, the information of the voices collected by the sound-collecting device may be transmitted to the information processing apparatus 10 of the conversation partner as the voice information in the video chatting, and then the voices may be output from a voice output device of the information processing apparatus 10 of the conversation partner. In this manner, the information of the captured images photographed by the imaging section 111 and/or the information of the voices collected by the sound-collecting device can be used by the operation information acquisition unit 110 for acquiring the operation information, and can also be used as the video information and/or voice information in the video chatting.

The display unit 120 is a display part for visually displaying various kinds of information to the user in all forms of image, text, graphs, and the like. The display unit 120 has a display device, for example, a display or the like, and display of a display screen of the display device is controlled by, for example, a display control section 142 of the control unit 140. In the present embodiment, the display unit 120 displays content other than a captured image of the conversation partner in the video chatting on the display screen as the first content. In addition, the display unit 120 displays the captured image of the conversation partner in the video chatting on the display screen as the second content together with the first content. The user can perform the video chatting while viewing the display screen of the display unit 120. Display control of the display screen of the display unit 120 will be described later in detail when a function of the display control section 142 is described. Furthermore, display of the display screen of the display unit 120 will be described in detail in (2-2. Display control process according to a present embodiment) while illustrating a specific display example of the display screen.

The communication unit 130 is a communication part for connecting the information processing apparatus 10 to another external apparatus (external apparatus) so that the apparatuses can transmit and receive various kinds of information to and from each other. In the present embodiment, the communication unit 130 transmits and receives various kinds of information relating to the video chatting and various kinds of information relating to the display control process via the network 30 between the system management server 20 and the other information processing apparatus 10. For example, the communication unit 130 transmits and receives various kinds of information necessary for using the video chatting such as the account information to and from the system management server 20 via the network 30. In addition, for example, the communication unit 130 transmits and receives the video information and/or the voice information of the video chatting, and information of a response request for the transmission and reception of the video information and/or voice information, a response to the response request, and the like to and from the information processing apparatus 10 of the conversation partner via the network 30. Here, in the present embodiment, the response request is a request transmitted from one information processing apparatus 10 to the other information processing apparatus 10, and a request for asking whether or not the video information and/or the voice information is transmitted or received in the video chatting. The user who receives the response request, or the conversation partner, can respond and start a conversation by allowing the transmission and reception of the video information and/or voice information, or can respond by not allowing the transmission and reception when there is a reason for which the conversation may be difficult. Note that the response request and a response thereto may be made only for the video information, and only for the voice information.

The control unit 140 comprehensively controls the information processing apparatus 10 and performs various processes in the display control process according to the present embodiment. Note that FIG. 1 mainly illustrates the configuration relating to the display control process according to the present embodiment with regard to the configuration of the control unit 140, and does not illustrate other configurations. However, the control unit 140 may have other kinds of configurations not illustrated in FIG. 1. For example, the control unit 140 further has various configurations for performing video chatting.

The function and the configuration of the control unit 140 will be described in detail. Referring to FIG. 1, the control unit 140 has the trigger operation detection section 141 and the display control section 142.

The trigger operation detection section 141 detects a trigger operation that is a specific operation of the user performed with respect to the display screen based on the operation information that is information of operations performed by the user. In the present embodiment, the trigger operation detection section 141 can detect the trigger operation based on the operation information of the user acquired by the operation information acquisition unit 110.

Here, the trigger operation is an operation of triggering switching of display of the display screen of the display unit 120 between the first display state and the second display state according to control by the display control section 142 to be described later. In the present embodiment, the trigger operation may be any operation as long as it is a specific operation relating to operations of the user, and can be appropriately set by the user. For example, the trigger operation may include an operation relating to a line of sight of the user. To be specific, the trigger operation may be an operation of the user turning his or her line of sight to a predetermined region within the display screen. The predetermined region referred to here can be set to be, for example, an end (side) of at least any of the four corners or the upper, lower, right and left directions of the display screen. In other words, the trigger operation may be an operation of the user turning his or her line of sight to a predetermined end or corner of the display screen. In addition, the trigger operation may be, for example, a watching operation in which the user turns his or her line of sight in the direction of at least one side of the display screen and then watches a space of the display screen corresponding to depth of the direction of the line of sight of the user. Details of the watching operation will be described in (2-2. Display control process according to a present embodiment) below with reference to FIGS. 3A and 3B. Note that the trigger operation detection section 141 can detect the watching operation based on, for example, information of a motion of at least the head and the line of sight of the user included in the operation information acquired by the operation information acquisition unit 110.

In addition, the trigger operation may be an operation, for example, in which the user moves at least a part of his or her body in a first direction with respect to the display screen. Here, the first direction in the trigger operation is a direction, for example, which is substantially parallel to the upper-lower direction or the right-left direction of the display screen of the display unit 120. Although this will be described later, in the display control process according to the present embodiment, display control of inserting the second content onto the display screen from the first direction in the trigger operation can be performed. Thus, by setting the trigger operation with the first direction as the direction substantially parallel to the upper-lower direction or the right-left direction of the display screen of the display unit 120, the direction in which the second content is inserted is the upper-lower direction or the right-left direction of the display screen, and a configuration of displaying the first content and the second content within the display screen is put in order, which enables the user to view the content more easily. However, in the present embodiment, the first direction in the trigger operation is not limited to the example, and may be an oblique direction or substantially perpendicular direction with respect to the display screen of the display unit 120. Note that, in description below, a term indicating a direction such as the upper-lower direction is set to mean a direction of the display screen as viewed by the user who faces the display screen of the display unit 120 unless specifically described.

Furthermore, the trigger operation is not limited to one operation, and each of a plurality of different operations may be set as a trigger operation. The trigger operation detection section 141 can detect each of the plurality of operations set as a trigger operation based on the operation information. For example, a few operations among the trigger operations as described above may all be set as trigger operations. In addition, when a trigger operation is an operation in which the user moves at least a part of his or her body in the first direction of the display screen, an operation in which the user moves at least another part of his or her body in another direction different from the first direction may be further set as a trigger operation. The trigger operation detection section 141 can detect operations in which the user moves at least parts of his or her body in a plurality of different directions of the display screen as trigger operations.

In addition, the trigger operation may also include an operation of stopping a trigger operation performed by the user. For example, when a trigger operation is an operation in which a line of sight is turned to a predetermined region as described above, an operation of the user turning his or her line of sight away from the predetermined region (for example, an operation of returning the line of sight to the original direction) may also be a trigger operation. Furthermore, when the trigger operation is the watching operation described above, for example, an operation of the user stopping the watching operation and returning to the original attitude may also be a trigger operation.

In addition, the trigger operation is not limited to an operation accompanied with a motion of the user, and may be an operation of the user, for example, emitting his or her voice. When the trigger operation is an operation of emitting a voice, the operation information acquisition unit 110 acquires information of the voice emitted by the user, and then the trigger operation detection section 141 can detect the trigger operation based on the information of the voice. Furthermore, the trigger operation detection section 141 may have a voice recognition function and detect an operation of the user emitting his or her voice including a specific word as a trigger operation.

The trigger operation detection section 141 transmits information that a trigger operation has been detected to the display control section 142 and the communication unit 130. As described above, in the present embodiment, as the trigger operation is detected, display on the display screen of the display unit 120 is switched between the first display state and the second display state. Since a captured image of the conversation partner that is the second content in the video chatting is displayed on the display screen in the second display state, the communication unit 130 that receives the information that the trigger operation has been detected performs transmission and reception of various kinds of information relating to the video chatting between the information processing apparatus 10 of the conversation partner in order to obtain the captured image of the conversation partner from the information processing apparatus 10 of the conversation partner. Note that, in the present embodiment, transmission and reception of the video information are not performed in the first display state, and only the voice information may be transmitted and received, or the voice information and the video information, may not be transmitted and received. In addition, before the display on the display screen of the display unit 120 is switched from the first display state to the second display state, the communication unit 130 may exchange a response request for the transmission and reception of the video information and/or the voice information of the video chatting and a response to the response request with the information processing apparatus 10 of the conversation partner.

The display control section 142 performs display control of switching the first display state in which the first content is displayed and the second content relating to the first content is not displayed on the display screen of the display unit 120 and the second display state in which the first content and the second content are at least displayed on the display screen according to the trigger operation detected by the trigger operation detection section 141. Note that, in the present embodiment, only the first content may be displayed on the display screen or content other than the second content may be displayed on the display screen together with the first content in the first display state. As described above, the display control section 142 according to the present embodiment may have a function of at least controlling display of the first content and the second content on the display screen of the display unit 120, and have the function of switching the first display state in which only the first content is displayed among the first content and the second content and the second display state in which the first content and the second content are at least displayed. In the present embodiment, as the user performs an operation set as the trigger operation, display on the display screen of the display unit 120 is controlled.

As described above, for example, the first content may be content other than the captured image of the conversation partner in the video chatting and the second content may be the captured image of the conversation partner in the video chatting in the present embodiment. Therefore, the user can control the display on the display screen to be in a desired display state by performing the trigger operation of setting a state of the display screen to be the first display state when the user wants to concentrate on viewing other content (for example, a television program or the like), or setting a state of the display screen to be the second display state when the user wants to communicate with a partner of the video chatting such as talking about their thoughts on the television program. Thereby, display control highly convenient for the user in the video chatting is realized.

Hereinafter, the display control of the display screen performed by the display control section 142 will be described in more detail.

For example, the display control section 142 may cause the first content and the second content to be displayed in different regions within the display screen of the display unit 120 in the second display state. In other words, the display control section 142 can cause the first content and the second content to be displayed without being superimposed on each other in the second display state. By causing the first content and the second content to be displayed without being superimposed on each other by the display control section 142, the user's viewing of the first content is not obstructed by display of the second content. Note that sizes of the regions in which the first content and the second content are respectively displayed (in other words, a ratio of the display regions of the first content and the second content to the display screen) may be appropriately set by the user.

In addition, when the trigger operation is the watching operation, the display control section 142 may switch the first display state to the second display state by inserting the second content onto the display screen in a direction in which the user watches in the watching operation. Furthermore, the display control section 142 may insert the second content onto the display screen gradually (in stages) according to a movement amount of a motion (a watching amount) of at least any of the head and a line of sight of the user in the watching operation. In this manner, by controlling the display such that a display amount of the second content on the display screen is adjusted according to the watching amount in the watching operation, the user can more conveniently adjust the ratio of the display regions of the first content and the second content within the display screen in the second display state. Note that the display control of gradually inserting the second content onto the display screen includes a mode in which the captured image of the conversation partner is gradually displayed, and also includes a mode in which a display region of the captured image of the conversation partner gradually expands in a state in which the whole captured image is displayed. Details of the trigger operation and details of the display method when the second content is inserted onto the display screen according to the trigger operation are appropriately set by the user.

Furthermore, when the trigger operation is the watching operation, the display control section 142 may cause the second content to be displayed on the display screen using a three-dimensional image in which the depth of the display screen is reflected in a direction of a line of sight of the user in the watching operation in the second display state. Moreover, the display control section 142 may change an angle of the three-dimensional image of the second content and display of a position thereof in the depth direction according to a movement amount of a motion (a watching amount) of at least any of the head and the line of sight of the user in the watching operation in the second display state. In this manner, by displaying the captured image of the conversation partner that is the second content as a three-dimensional image in linkage with the watching operation, the user can have a sense of realism as if he or she were talking with the conversation partner face-to-face. Note that the display control using the three-dimensional image in linkage with the watching operation will be described in detail later with reference to FIGS. 3A and 3B.

In addition, when the trigger operation is an operation in which the user moves at least a part of his or her body in the first direction with respect to the display screen, the display control section 142 may switch the first display state to the second display state by inserting the second content onto the display screen in the first direction. Furthermore, the display control section 142 may insert the second content onto the display screen gradually (in stages) according to a movement amount of at least a part of the body of the user in the first direction in the trigger operation. In this manner, by controlling display such that a display amount of the second content on the display screen is adjusted according to the movement amount of at least a part of the body of the user in the first direction in the trigger operation, the user can more conveniently adjust a ratio of the display regions of the first content and the second content within the display screen in the second display state. Note that the display control of gradually inserting the second content onto the display screen includes a mode in which the captured image of the conversation partner is gradually displayed and also includes a mode in which a display region of the captured image of the conversation partner gradually expands in a state in which the whole captured image is displayed. Details of the trigger operation and details of the display method when the second content is inserted onto the display screen according to the trigger operation are appropriately set by the user.

Furthermore, the display control section 142 may display a plurality of different pieces of second content on the display screen in the second display state. For example, when three of more persons perform video chatting, there are a plurality of conversation partners, and accordingly there are also a plurality of captured images of the conversation partners which are the second content. In this case, the display control section 142 may display the plurality of captured images of the conversation partners on the display screen together with the first content in the second display state. Note that, when the plurality of different pieces of second content are displayed on the display screen in the second display state, the display control according to the watching operation and the operation in which the user moves at least a part of his or her body in the first direction with respect to the display screen as described above may be performed with respect to display of each piece of the second content.

Moreover, the display control section 142 may cause third content relating to at least any of the first content and the second content to be further displayed on the display screen together with the first content and the second content in the second display state. For example, when the first content is a television program and the second content is the captured image of the conversation partner in video chatting, the third content may be an image or text indicating program information of the television program, or an image and text indicating profile information of the conversation partner. Thus, the display control section 142 may cause the television program that is the first content, the captured image of the conversation partner, and the image and text indicating the program information of the television program or an image or text indicating the profile information of the conversation partner to be displayed on the display screen in the second display state.

In addition, the display control section 142 may cause other content (fourth content) not relating to any of the first content and the second content to be further displayed on the display screen in the second display state. The fourth content is, for example, an operation screen of another application, or the like. By causing the first, second, third, and fourth content to be displayed on the display screen in the second display state, the user can perform video chatting while viewing, for example, a television program, and can read information of the television program, or contribute his or her thoughts on the television program to another service (for example, various social networking services, social networking sites, social media, and the like) different from the video chatting system, and thereby a freer method for the user to enjoy content is realized. In this manner, the display control section 142 can cause other content to be further displayed on the display screen in the second display state in addition to the first content and the second content. Note that, when a plurality of different pieces of content are displayed on the display screen in the second display state, the display control according to the watching operation and the operation in which the user moves at least a part of his or her body in the first direction with respect to the display screen as described above may be performed with respect to display of each piece of the content.

Furthermore, when the display control section 142 causes a plurality of different pieces of content including the first content and the second content to be displayed on the display screen in the second display state, the display screen may be divided into regions at least in the number of pieces of the content or more, and the pieces may be displayed in the different regions so that the plurality of pieces of content are not superimposed on one another. By causing the plurality of different pieces of content to be displayed on the display screen without superimposition, the user easily views each piece of the content. Note that sizes of the regions in which the pieces of the content are respectively displayed (in other words, a ratio of the display regions of the content to the display screen) may be appropriately set by the user.

Here, in the present embodiment, if the second content is displayed on the display screen, even if only slightly, the state can be called the second display state. Thus, in the present embodiment, both cases in which display of the display screen is instantaneously changed from the first display state to a state in which the second content is displayed in a predetermined region within the display screen and in which display of the display screen is changed from the first display state by gradually inserting the second content onto the display screen are assumed to be called switching from the first display state to the second display state.

Hereinabove, the display control of the display screen by the display control section 142 has been specifically described. Note that further details of the display control of the display screen by the display control section 142 will be described in (2-2. Display control process according to a present embodiment) below illustrating specific examples of the display screen.

Hereinabove, details of the configuration example of the display control system 1 and the information processing apparatus 10 according to the embodiment of the present disclosure have been described with reference to FIG. 1. Each of the constituent elements described above may be configured using general-purpose members or circuits, or may be configured using hardware specialized in the functions of the constituent elements. In addition, with particular regard to the control unit 140 of the information processing apparatus 10, a CPU or the like may perform the functions of the constituent elements. Thus, configurations to be used can be appropriately changed according to technical levels whenever the present embodiment is executed.

As described hereinabove, in the present embodiment, the trigger operation detection section 141 detects the trigger operation that is a specific operation performed by the user with respect to the display screen based on the operation information that is information of operations performed by the user. In addition, the display control section 142 performs display control of switching the first display state in which the first content is displayed and the second content relating to the first content is not displayed on the display screen and the second display state in which the first content and the second content are at least displayed on the display screen according to the detected trigger operation. Accordingly, the switching of the first display state and the second display state can be easily performed by the user with a simple operation, and thereby user convenience is enhanced.

Furthermore, the display control process according to the present embodiment can be combined with use of the video chatting system. When the video chatting system is used, for example, the first content can be set to be content other than the captured image of the conversation partner of video chatting (for example, a television program or the like), and the second content can be set to be the captured image of the conversation partner of the video chatting. The user can easily perform switching of the display screen following his or her intention by performing the trigger operation such that the user sets the display screen to be the first display screen when, for example, he or she want to pause his or her conversation with the conversation partner and to concentrate on viewing other content, and sets the display screen to be the second display state when he or she wants to talk with the conversation partner such as to inform the partner of his or her thoughts on the content. In addition, since switching between the first display state and the second display state can be performed with a comparatively simple operation called a trigger operation, the user can perform video chatting without viewing of the first content being obstructed. Therefore, convenience of the user when using video chatting is enhanced.

In addition, in the present embodiment, the trigger operation may include an operation relating to a line of sight of the user. To be specific, the trigger operation may be an operation of the user causing his or her line of sight face a predetermined region within the display screen, or may be the watching operation. Furthermore, in the present embodiment, the display control may also be performed such that the second content is gradually inserted onto the display screen according to an amount of watching in the watching operation. Thus, using a comparatively simple operation of moving the head and/or a line of sight, the user can more conveniently adjust a ratio of a display region of the first content and a display region of the second content to the display screen in the second display state according to situations. In this manner, in the present embodiment, a ratio of a display region of the first content and a display region of the second content to the display screen in the second display state can be controlled according to locations of a line of sight of the user. Thus, the display control process with a higher level of freedom for the user is realized.

Note that the configuration of the information processing apparatus 10 according to the present embodiment is not limited to that illustrated in FIG. 1. The information processing apparatus 10 may further have a known configuration that a general information processing apparatus such as a PC has, in addition to the configuration illustrated in FIG. 1. In addition, in the present embodiment, it is not necessary for each of the functions of the information processing apparatus 10 described above to be mounted in one apparatus, and the functions of the information processing apparatus 10 may be realized by a plurality of apparatuses by separating the constituent elements of the information processing apparatus 10 illustrated in FIG. 1 and mounting them in the plurality of different apparatuses. For example, the information processing apparatus 10 illustrated in FIG. 1 may be configured such that a first apparatus having the configuration of the control unit 140 and a second apparatus having other configurations are included, only the second apparatus is placed under discretion of the user, and the first apparatus is set to be a so-called cloud server or the like connected to the second apparatus via a network. As described above, in the present embodiment, the configuration of the display control system 1 and the information processing apparatus 10 for realizing the display control process is not limited to the example illustrated in FIG. 1, and an arbitrary configuration can be used for the display control system 1 and the information processing apparatus 10 as long as the display control process described above is performed.

2. SPECIFIC EXAMPLE OF A DISPLAY CONTROL PROCESS

Next, the display control process according to the present embodiment will be described in more detail illustrating specific display examples of display screens. Hereinbelow, in order to clarify the display control process according to the present embodiment first, an existing general display control process will be described in (2-1. Existing general display control process). Next, the display control process according to the present embodiment will be described in (2-2. Display control process according to a present embodiment). Note that, in (2-1. Existing general display control process) and (2-2. Display control process according to a present embodiment) below, the display control process of the display screen when video chatting is performed while other content (for example, a television program distributed from a broadcasting station or the like) is viewed will be described exemplifying a case in which the video chatting system is used.

(2-1. Existing General Display Control Process)

First, an existing general display control process will be described with reference to FIGS. 2A and 2B. FIGS. 2A and 2B are brief diagrams schematically illustrating examples of a display screen in an existing general display control process.

Referring to FIG. 2A, a display screen 210 and air imaging section 220 disposed in an upper portion of the display screen 210 are illustrated. Note that the display screen. 210 is actually a part of a display apparatus or an information processing apparatus and the imaging section 220 is provided in a portion of such a display apparatus or information processing apparatus, however, for the sake of simplification. FIG. 2A schematically illustrates only the display screen 210 and the imaging section 220 mainly necessary for describing the display control process, and other configurations are omitted in the illustration. Note that, in the same manner, FIG. 2B that will be shown hereinbelow is also assumed to schematically illustrate only the display screen 210 and the imaging section 220.

The imaging section 220 is an imaging part such as a camera which can photograph imaging targets in the form of a still image, a moving image, and the like. The imaging section 220 photographs users (a user and conversation partners) of video chatting, and by transmitting the photographed images to counterparts, the video chatting is performed. During use of the video chatting, the user is expected to be positioned in a location in which be or she faces the display screen 210, and thus the imaging section 220 is disposed in the upper portion of the display screen 210 so that the space formed by facing the display screen is set to be a photograph range.

The display screen 210 displays first content 211 and second content 212. In the example illustrated in FIG. 2A, the first content is a television program broadcasting a baseball game, and the second content is an image of a conversation partner in video chatting. Referring to FIG. 2A, on the display screen 210, the second content is displayed superimposed on a partial region of a display region of the first content. The superimposed portion in the display can be an obstruction when the user views the first content.

In addition, FIG. 2B illustrates a different display example from FIG. 2A of a display screen in a general display control process. Referring to FIG. 2B, the display screen 210 and the imaging section 220 disposed in the upper portion of the display screen 210 are illustrated. Note that since a function and configuration of the imaging section 220 are the same as those of the imaging section 220 illustrated in FIG. 2A, detailed description will not be repeated.

Referring to FIG. 2B, the first content 211 and the second content 212 are displayed on the display screen 210. However, in the example illustrated in FIG. 2B, the display screen 210 is divided into a plurality of regions and the first content and the second content are respectively displayed in the different regions unlike in the example illustrated in FIG. 2A. In such divided display, the first content is further reduced and displayed in comparison to a case in which the first content is displayed on the entire display screen 210, which may hinder the user from viewing the first content.

Hereinabove, the specific display example of the display screens in the general display control process has been described with reference to FIGS. 2A and 2B. As illustrated in to FIGS. 2A and 2B, in the general display control process, for example, the first content and the second content are superimposed and displayed or respectively displayed in different regions on the display screen 210. Thus, there is a possibility of the user's viewing of the first content being obstructed. Accordingly, even when the user wants to pause his or her conversation in video chatting momentarily and to concentrate on viewing the first content, for example, it is difficult for the user to satisfactorily view the first content, which causes deterioration of convenience of the user. In addition, it may possible to switch display of the display screen 210 from the states illustrated in FIGS. 2A and 2B to a state in which only the first content is displayed by performing an operation input using an input part such as a remote controller or a keyboard, however, a more convenient display state switching method that can be performed while concentration on the display screen 210 is maintained (performed while the eyes remain on the display screen 210) has been demanded.

On the other hand, as described in <1. Configuration of a display control system and an information processing apparatus> above, in the display control process according to the present embodiment, the trigger operation detection section 141 detects the trigger operation that is a specific operation performed by the user with respect to the display screen based on the operation information that is information of operations performed by the user. In addition, the display control section 142 performs display control of switching the first display state in which the first content is displayed and the second content relating to the first content is not displayed on the display screen and the second display state in which the first content and the second content are at least displayed on the display screen according to the detected trigger operation. Accordingly, the display states of the display screen can be switched with a simple trigger operation when the user wants to concentrate on viewing the first content and when the user wants to talk with a conversation partner of video chatting. Therefore, a display state can be controlled at a higher level of user convenience such that, for example, the user concentrates on viewing the first content in the first display state at normal times and switches to the second display state by performing a simple trigger operation if necessary.

(2-2. Display Control Process According to a Present Embodiment)

Next, a specific example of the display control process according to the present embodiment will be described in more detail illustrating display examples of a display screen.

(2-2-1. Display Control Using a Watching Operation)

First, the display control process when the trigger operation is the watching operation will be described with reference to FIGS. 3A to 3C. FIGS. 3A to 3C are brief diagrams schematically illustrating examples of a display screen in the display control process when the trigger operation is the watching operation. Note that, with regard to FIGS. 3A to 3C, description will be provided exemplifying a case in which a display state is switched from the first display state to the second display state by detecting the watching operation.

FIG. 3A illustrates an example of a display screen in the first display state. Referring to FIG. 3A, the display screen 310 and an imaging section 320 disposed in an upper portion of the display screen 310 are illustrated. Here, since the display screen 310 corresponds to the display screen of the display unit 120 shown in FIG. 1 and the imaging section 320 corresponds to the imaging section 111 shown in FIG. 1, detailed description of a function and configuration thereof will be omitted. Note that the display screen 310 is actually a part of the display unit 120 of the information processing apparatus 10 and the imaging section 320 is provided in a portion of the information processing apparatus 10, however, for the sake of simplification, only the display screen 310 and the imaging section 320 that are mainly necessary for describing the display control process are schematically illustrated in FIG. 3A, and other configurations will not be illustrated. Note that, also in FIGS. 3B, 3C, 4A, 4B, 5, and 6 which will be shown below only the display screen 310 and the imaging section 320 are set to be schematically illustrated in the same manner. In addition, in FIGS. 3B, 3C, 4A, 4B, 5, and 6, overlaps of detailed description of the function and configuration of the display screen 310 and the imaging section 320 will be omitted.

The imaging section 320 corresponds to the imaging section 111 shown in FIG. 1 as described above, and is an imaging part such as a camera that can photograph imaging targets in the form of a still image, a moving image, and the like. In the present embodiment, a captured image photographed by the imaging section 320 may be used in acquiring operation information of the user by the operation information acquisition unit 110, and may be used as video information in video chatting. Since the user is expected to be positioned in a location facing, the display screen 310 when using video chatting, the imaging section 320 is disposed in the upper portion of the display screen 310 so that the space formed by facing the display screen is set to be a photograph range.

Referring to FIG. 3A, the display screen 310 only displays first content 311. A user 330 is positioned, for example, substantially right in front of the display screen 310 viewing the first content. Note that a dashed-lined arrow beginning from the user 330 schematically indicates a direction of a line of sight of the user 330. In addition, the example illustrated in FIG. 3A illustrates that only the first content is displayed on the display screen 310 as the first display state, however, in the present embodiment, content other than the second content may be displayed on the display screen 310 together with the first content in the first display state.

FIG. 3B illustrates that the watching operation is performed by the user and display on the display screen 310 is changed to the second display state. Referring to FIG. 3B, in the second display state, second content 312 is displayed on the display screen as a three-dimensional image that reflects the depth of the display screen in the direction of the line of sight of the user in the watching operation. To be specific, when the display screen 310 is assumed to form one face of a hypothetical cuboid, the second content 312 is displayed on the display screen 310 such that the second content 312 is displayed in the direction of an inner face of the cuboid positioned in the direction of the line of sight of the watching operation. In other words, the second content 312 is displayed on the display screen 310 so that the user receives an impression such that the display screen 310 is recognized as a "window" of a room and the room (space) is present on the side that the display screen 310 faces, and the second content 312 is present in the space. Note that, in FIG. 3B, in order to clarify description with regard to three-dimensional display, dashed lines indicating the hypothetical depth (the hypothetical cuboid) of the display screen 310 are shown.

In addition, in the second display state illustrated in FIG. 3B, a region in which the first content 311 is displayed on the display screen 310 is reduced, and in a space generated from the reduction, the second content 312 may be displayed such that the second content 312 is inserted thereinto in the direction of the line of sight of the user in the watching operation (in other words, the watching direction, or the right direction in the example illustrated in FIG. 3B). Furthermore, the second content 312 may be gradually inserted onto the display screen according to a movement amount of a motion of at least any of the head and the line of sight of the user in the watching operation. Moreover, according to a watching amount of the watching operation, an angle of the three-dimensional image of the second content and display of a position thereof in the depth direction may be changed. In terms of a natural sense of feeling, when the watching operation is not performed, in other words, when the user 330 faces substantially frontward and the watching amount is almost 0, the inner face of the hypothetical cuboid that includes the display screen 310 as one face may barely be seen. On the other hand, as the watching amount increases, a rate of the inner face of the hypothetical cuboid that is seen is considered to increase. In the present embodiment, an area of a display region of the second content 312 corresponding to the inner face of the hypothetical cuboid that includes the display screen 310 as one face may be changed according to the watching amount in accordance with the natural sense of feeling of the user (in other words, an amount of the second content 312 to be inserted onto the display screen 310 may be changed). In addition, when the second content 312 is displayed as a three-dimensional image, an angle of the three-dimensional image or a position thereof in the depth direction may be changed according to the watching amount (the direction of the line of sight) of the user so that the user has a feeling as if he or she were actually watching a three-dimensional object.

As illustrated in FIG. 3B, by displaying a captured image of a conversation partner that is the second content 312 as a three-dimensional image and changing display of the three-dimensional image in linkage with the watching operation, the user can receive a sense of realism as if he or she were talking face-to-face with the conversation partner.

Note that, in the present embodiment, the second content 312 may not be displayed as a three-dimensional image. A display example different from the display example illustrated in FIG. 3B with regard to the display control process according to the present embodiment will be described with reference to FIG. 3C.

FIG. 3C illustrates that the user performs the watching operation and display of the display screen 310 is changed to the second display state. However, the example illustrated in FIG. 3C is different from the example illustrated in FIG. 3B, and the second content is two-dimensionally displayed in a predetermined region on the display screen 310, rather than a three-dimensional image.

In the same manner as in the display example illustrated in FIG. 3B, in the second display state illustrated in FIG. 3C, a region on the display screen 310 in which the first content 311 is displayed is reduced and the second content 312 may be displayed by inserting the second content 312 into the space generated from the reduction in the direction of the line of sight of the user in the watching operation (in other words, the watching direction or the right direction in the example illustrated in FIG. 3C). In addition, the second content 312 may be gradually inserted onto the display screen according to a movement amount of a motion of at least any of the head and the line of sight of the user in the watching operation (a watching amount).

Hereinabove, with reference to FIGS. 3A to 3C, the display control process according to the present embodiment when the trigger operation is the watching operation has been described. As described above, switching between the first display state and the second display state can be performed with a comparatively simple operation of the watching operation in the present embodiment. Thus, high user convenience is realized in the display control process.

Furthermore, in the present embodiment, display control may be performed such that the second content 312 is gradually inserted onto the display screen 310 according to a watching amount of the watching operation. Thus, a ratio of the display region of the first content 311 and the display region of the second content 312 to the display screen 310 can be controlled according to a motion of the head and/or the line of sight of the user. Accordingly, the user can control the display ratio of the first content and the second content to the display screen 310 with a comparatively simple operation according to situations, and thereby the display control process with a higher level of freedom for the user is realized.

In addition, as illustrated in FIG. 3B, the second content 312 may be displayed as a three-dimensional image that reflects the depth of the display screen 310 in linkage with the watching operation in the second display state in the present embodiment. Furthermore, display of the three-dimensional image can be changed according to a watching amount of the watching operation so as to be suitable for the natural sense of feeling of the user (to be suitable for the sense of the user seeing a three-dimensional object by changing a perspective). Accordingly, a sense of realism as if the user were talking with the conversation partner face-to-face can be obtained in communication with the conversation partner in video chatting after switching to the second display state.

Note that display control of switching display on the display screen 310 from the second display state illustrated in FIG. 3B or 3C to the first display state illustrated in FIG. 3A again may be performed with, for example, another trigger operation different from the watching operation. In the present embodiment, a trigger operation for switching the first display state and the second display state can be appropriately set by the user, and switching the first display state and the second display state is possible with a simple operation. Note that, as described above, an operation of stopping the watching operation (in other words, an operation of the user returning his or her head and/or line of sight so as to see the display screen 310 in the front direction) can also be a trigger operation in the present embodiment. Thus, display of the display screen 310 may be switched from the first display state to the second display state with the watching operation and from the second display state to the first display state with an operation of stopping the watching operation.

(2-2-2. Display of a Plurality of Pieces of Second Content)

Next, with reference to FIGS. 4A and 4B, the display control process when there are a plurality of conversation partners in video chatting will be described. FIGS. 4A and 4B are brief diagrams schematically illustrating examples of the display screen in the display control process when there are a plurality of conversation partners in video chatting.

In the present embodiment, the user can also talk with a plurality of conversation partners in the video chaffing system. When the user talks with a plurality of conversation partners, captured images of the conversation partners may be displayed on the display screen as a plurality of different pieces of second content. FIGS. 4A and 4B illustrate examples of the display screen in the second display state when there are a plurality of conversation partners.

Referring to FIG. 4A the display screen 310 and the imaging section 320 disposed in an upper portion of the display screen 310 are illustrated. On the display screen 310, the first content 311 and a plurality of different pieces of second content 312 are displayed. The plurality of different pieces of second content are, for example, the captured images of the plurality of different conversation partners of the video chatting system. In the example illustrated in FIG. 4A, the number of conversation partners is two, and two pieces of the second content 312 are displayed in different regions provided on the right and left sides of the display screen 310. In addition, the two pieces of the second content 312 are displayed as three-dimensional images like the second content 312 illustrated in FIG. 3B.

Furthermore, FIG. 4B illustrates a display example of the display screen in the second display state when there are the plurality of conversation partners, different from FIG. 4A. Referring to FIG. 4B, the display screen 310 and the imaging section 320 disposed in an upper portion of the display screen 310 are illustrated. On the display screen 310, the first content 311 and the plurality of different pieces of second content 312 are displayed. The plurality of different pieces of second content are, for example, the captured images of the plurality of different conversation partners of the video chatting system. In the example illustrated in FIG. 4B, the number of conversation partners is also two, and two pieces of the second content 312 are displayed on the display screen 310 in the same manner as in the example illustrated in FIG. 4A. However, in the example illustrated in FIG. 4B, a region provided on the right side of the display screen 310 is further partitioned into two regions by a partition 315, and the two pieces of the second content 312 are respectively displayed therein, different from FIG. 4A. In addition, the two pieces of the second content 312 may be displayed as three-dimensional images in the same manner as the second content 312 illustrated in FIG. 3B. In this manner, in the present embodiment, the method for displaying the plurality of different pieces of second content is not limited, and the different pieces of second content may be respectively displayed in different regions on the display screen 310 as illustrated in FIG. 4A, or may be displayed together in the same region on the display screen 310 as illustrated in FIG. 4B.

In addition, the trigger operation for switching the first display state to the second display state illustrated in FIGS. 4A and 4B may be, for example, the watching operation. For example, in the display example illustrated in FIG. 4A, the second content 312 on the right side may be displayed through the watching operation of watching the right end of the display screen 310, and the second content 312 on the left side may be displayed through the watching operation of watching the left end of the display screen 310. Furthermore, it is possible to perform setting in advance such that the captured image of a specific conversation partner is displayed through the watching operation in a specific direction of the display screen. Moreover, in the display example illustrated in FIG. 4B, the second content 312 may be displayed in a region on the right side of the display screen 310 through the watching operation of watching the right end of the display screen 310, and the number of pieces and details of the second content 312 to be displayed (in other words, whose captured image among the conversation partners should be selected) may be adjusted through other operation (trigger operation), or operation inputs performed by the user, or the like. In addition, when display is to be switched to the second display state as illustrated in FIGS. 4A and 4B through the watching operation, display of the plurality of pieces of second content 312 displayed as three-dimensional images may be changed according to a watching amount in the watching operation in the same manner as in the display control of the second content 312 described in (2-2-1. Display control using a watching operation) above.

Furthermore, the trigger operation for switching the first display state to the second display state illustrated in FIGS. 4A and 4B may be, for example, an operation of the user moving at least a part of his or her body in the first direction with respect to the display screen. In the display example illustrated in FIG. 4A, for example, one piece of the second content 312 may be displayed in a region on the right end of the display screen 310 through an operation of moving a part of the body from the right direction to the left direction of the display screen 310, and the other piece of the second content 312 may be displayed in a region on the left end of the display screen 310 through an operation of moving a part of the body from the left direction to the right direction of the display screen 310. In addition, it is also possible to perform setting in advance such that the captured image of a specific conversation partner is displayed through an operation of moving at least a part of the body in a specific direction of the display screen. Furthermore, in the display example illustrated in FIG. 4B, the second content 312 may be displayed in a region on the right end of the display screen 310 through a movement of a part of the body from the right direction to the left direction of the display screen 310, and the number of pieces and details of the second content 312 to be displayed (in other words, whose captured image among the conversation partners should be selected) may be adjusted through another operation (trigger operation), or operation inputs performed by the user, or the like.

Hereinabove, the display control process when there are the plurality of conversation partners in video chatting has been described with reference to FIGS. 4A and 4B. As described above, in the present embodiment, when the user talks with the plurality of conversation partners, the captured images of the conversation partners may be displayed on the display screen as the plurality of different pieces of second content in the second display state. In addition, through the trigger operation and a combination of the trigger operation and another trigger operation, the number of pieces and kinds of second content to be displayed may be controlled. Thus, the user can select the number of pieces and kinds of second content to be displayed in the second display state through a comparatively simple trigger operation.

Note that, although the two pieces of the second content are displayed in the second display state in the examples illustrated in FIGS. 4A and 4B, the present embodiment is not limited to the examples. The number of pieces of the second content to be displayed in the second display state is not limited to the examples illustrated in FIGS. 4A and 4B, and a greater number of pieces of the second content may be displayed on the display screen 310 in the second display state. In addition, display regions of the plurality of pieces of second content are not limited to the examples illustrated in FIGS. 4A and 4B, and regions in which the plurality of pieces of second content on the display screen 310 are displayed can be appropriately set by the user.

(2-2-3. Display of a Plurality of Different Pieces of Content)

Next, the display control process when a plurality of pieces of content of different kinds are displayed in the second display state will be described with reference to FIG. 5. FIG. 5 is a brief diagram schematically illustrating an example of the display screen in the display control process when a plurality of pieces of second content of different kinds are displayed in the second display state.

Referring to FIG. 5, the display screen 310 and the imaging section 320 disposed in an upper portion of the display screen 310 are illustrated. On the display screen 310, the first content 311, the second content 312, third content 313, and fourth content 314 are displayed respectively in different regions. Here, the first content 311 is, for example, a television program broadcasting a baseball game. In addition, the second content 312 is a captured image of a conversation partner in the video chatting system. In addition, the third content 313 is text indicating program information (for example, the profile, game records, and the like of a player in the field) of the television program that is the first content, and is information acquired from, for example, a broadcasting station or a production company of the television program via the communication unit 130 of the information processing apparatus 10. In addition, the fourth content 314 is a contributed comment, message, or the like in, for example, various kinds of social networking services, social networking sites, or social media, a comment that includes, for example, thoughts on the television program that is the first content 311, or a comment that the conversation partner of the video chatting system that is the second content 312 contributed.

In the example illustrated in FIG. 5, the second content 312 is displayed in a region on the right side of the display screen 310, the third content 313 is displayed in a region on the upper side, and the fourth content 314 is displayed in a region on the lower side. When the trigger operation is the watching operation, for example, through operations of watching the right end, the upper end, and the lower end of the display screen 310, the second content 312, the third content 313, and the fourth content 314 may be respectively displayed in the region on the right end, the region on the upper end, and the region on the lower end of the display screen 310. Furthermore, when the trigger operation is an operation of the user moving at least a part of his or her body in the first direction with respect to the display screen, for example, the second content 312, the third content 313, and the fourth content 314 may be respectively displayed in the region on the right end, the region on the upper end, and the region on the lower end of the display screen 310 through respective movements of the part of the body from the right direction to the left direction, from the upper direction to the lower direction, and from the lower direction to the upper direction of the display screen 310.

In this manner, in the present embodiment, the plurality of pieces of content of different kinds may be displayed on the display screen 310 in the second display state. In addition, display of the plurality of different pieces of content may be respectively controlled by a plurality of different trigger operations. Note that such content may be content relating to at least any other content, or may be content relating to no other content.

Note that, in the example illustrated in FIG. 5, although the second content 312, the third content 313, and the fourth content 314 are respectively displayed in the region on the right side, the region on the upper side, and the region on the lower side of the display screen 310, the present embodiment is not limited to the example. In the present embodiment, the number of regions or their locations in which the plurality of different pieces of content are displayed on the display screen 310 in the second display state may be appropriately set by the user. In addition, the kinds of the plurality of different pieces of content to be displayed on the display screen 310 are not limited to the example illustrated in FIG. 5, and content to be displayed on the display screen may be appropriately selected by the user among pieces of all content that can be acquired by the information processing apparatus 10.

Hereinabove, the display control process when the plurality of different pieces of content are displayed in the second display state has been described with reference to FIG. 5. As described above, in the present embodiment, a plurality of pieces of content of different kinds may be displayed on the display screen 310 in the second display state. In addition, the kinds and the number of pieces of content to be displayed, sizes and locations of display regions, and the like can be appropriately set by the user. Furthermore, such display control of a plurality of different pieces of content is realized through a simple trigger operation by the user. Thus, a way of enjoying content with a high level of freedom for the user not only of performing video chatting while viewing, for example, a television program, but also further acquiring information of the television program or executing other applications that do not relate to the content is realized.

(2-2-4. Correction of Display of a User and a Conversation Partner)

Next, a correction process of display of a user and a conversation partner in the second display state will be described with reference to FIG. 6. FIG. 6 is an illustrative diagram for describing a correction process of display of the user and the conversation partner in the second display state.

Referring to FIG. 6, the display screen 310 and the imaging sections 320 disposed in the upper, right, and left portions of the display screen 310 are illustrated. On the display screen 310, the first content 311 and the second content 312 are displayed in different regions. In the example illustrated in FIG. 6, the second content 312 is displayed in a region on the right side of the display screen 310 as a three-dimensional image as in the state illustrated in FIG. 3B.

Here, a case in which the trigger operation is the watching operation is assumed. When the trigger operation is the watching operation, the user 330 moves his or her upper body in the lateral direction according to the watching operation as illustrated in FIG. 6. In the video chatting system, a captured image of the user photographed by the imaging section 320 is displayed on the display unit 120 of the information processing apparatus 10 of the conversation partner, however, there is a possibility of display of the captured image of the user displayed on the display unit 120 of the conversation partner being deviated or distorted due to such a motion of the upper body of the user 330 caused by the watching operation. Conversely, a case in which the conversation partner performs the watching operation is also considered. Also in this case, since the relative positional relationship of the conversation partner and the imaging section 320 that photographs the conversation partner is changed due to the watching operation performed by the conversation partner, there is a possibility of a problem such as deviation of a position of the image of the conversation partner within the region in which the second content 312 illustrated in FIG. 6 is displayed, or overrunning of the image of the conversation partner beyond the region.

Thus, in the present embodiment, a function of correcting imbalance of captured images of the user and the conversation partner caused by the watching operation and other movements of the bodies of the user and the conversation partner can be included. Here, imbalance of a captured image includes a deviation of orientation of the captured image with respect to a display screen or a deviation of a position thereof in a display region. For example, without displaying the captured images of the user and the conversation partner photographed by the imaging section 320 on the display screen 310 as they are, the display control section 142 can correct the orientations of the captured images so that the images of the user and the conversation partner appear on the display screen 310 as images photographed substantially in front of the screen, or correct the positions of the captured images so that the images of the user and the conversation partner are positioned substantially at the centers of display regions. The display control section 142 may display the captured images whose imbalance has been corrected on the display screen as the second content in the second display state. Here, as illustrated in FIG. 6, the plurality of imaging sections 320 are provided in the upper, right, and left positions of the display screen 310 in the present embodiment. By appropriately performing an image combining process or the like based on captured images photographed at a plurality of different angles and obtained by the plurality of imaging sections 320, imbalance of the captured images of the user and the conversation partner may be corrected as described above. In addition, when imbalance of the captured images is to be corrected, three-dimensional correction may be performed by stereo-photographing the user and the conversation partner using the imaging sections 320 provided on the right and left sides of the display screen 310.

Furthermore, as another method of correcting imbalance of the captured images of the user and the conversation partner, movements of the imaging sections 320 may be controlled by providing a movable mechanism that can dynamically change a photograph range in the imaging sections 320 so that the imaging sections 320 trace motions of the user and the conversation partner, thereby photographing the user and the conversation partner front the front side as much as possible. Note that, when the method is executed, it is not necessary to provide the plurality of imaging sections 320 as illustrated in FIG. 6, and for example, one imaging section 320 that includes such a movable mechanism in an upper portion of the display screen 310 may be provided.

In addition, as still another method of correcting imbalance of the captured images of the user and the conversation partner, the imaging sections 320 may be respectively provided on the right and left sides of the display screen 310 as illustrated in FIG. 6, and the imaging sections 320 that photograph the user and the conversation partner may be switched when they face the front side and perform the watching operation. In other words, the imaging sections 320 provided on the right and left sides of the display screen 310 are provided in positions in which they can photograph the user and the conversation partner substantially from the front side when the watching operation is performed, the imaging section 320 provided in the upper portion photographs the user and the conversation partner when the user and the conversation partner face frontward, and the imaging section 320 provided in the position corresponding to the direction of the line of sight among the imaging sections 320 provided on the right and left side photographs the user and the conversation partner when the user and the conversation partner perform the watching operation.

Hereinabove, the correction process of display of the user and the conversation partner in the second display state has been described with reference to FIG. 6. As described above, in the present embodiment, when the captured images of the user and the conversation partner are displayed as second content in the second display state, imbalance of the captured images of the user and the conversation partner caused by the watching operation or other movements of the user and the conversation partner can be corrected. Thus, even when the trigger operation such as the watching operation is performed, for example, display positions of the images of the user and the conversation partner in display of the second content can be prevented from deviating or overrunning, and accordingly, the user can be provided with comfortable use of video chatting.

Note that, when the trigger operation is the watching operation, by providing the plurality of imaging sections 320 particularly on the right and left sides of the display screen 310 as illustrated in FIG. 6, an effect of preventing erroneous detection of the trigger operation can be obtained. For example, the watching operation is assumed to be set as an operation in which the user turns his or her head and line of sight to look at any one side of the display screen 310.

However, when the first content is accompanied with motions of an object on a screen, such as in a television program, the head and the line of sight of the user are considered to move tracing the motions of the object on the screen when the first content is viewed. Thus, if operation information of the user is acquired by one imaging section 320, there is a possibility of an operation that is not intended by the user being erroneously detected as the watching operation. Thus, by providing a plurality of imaging sections 320 as illustrated in FIG. 6 and acquiring operation information by capturing motions of the user at a plurality of angles, accuracy of the operation information is improved and such erroneous detection can accordingly be prevented. Particularly, by providing the imaging sections 320 on the right and left sides of the display screen 310, in other words, in positions corresponding to directions of the line of sight in the watching operation, movements of the line of sight of the user can be more accurately captured in the watching operation, and thus detection accuracy of the watching operation can be further improved.

Hereinabove, the specific examples of the display control process according to the present embodiment have been described in more detail with reference to FIGS. 3A to 3C, 4A, 4B, 5, and 6 illustrating the display examples of the display screen.

3. PROCESSING PROCEDURE OF THE DISPLAY CONTROL METHOD

Next, a processing procedure of a display control method according to an embodiment of the present disclosure will be described with reference to FIG. 7. FIG. 7 is a flowchart showing an example of the processing procedure of the display control method according to the embodiment of the present disclosure. Note that, in description provided hereinbelow with regard to the processing procedure of the display control method, although a case in which the display control method according to the present embodiment is realized using the display control system 1 and the information processing apparatus 10 shown in FIG. 1 will be exemplified, since the function and configuration of constituent elements of the display control system 1 and the information processing apparatus 10 have already been described in <1. Configuration of a display control system and an information processing apparatus>, detailed description thereof will not be repeated.

Referring to FIG. 7, first, the video chatting system is started in Step S401. In the present embodiment, since the display control process is performed on the display screen during use of the video chatting system, the process of Step S401 can be said to be a process in the stage before the display control method according to the present embodiment is performed. The process of Step S401 may be in compliance with the video chatting system provided by the system management server 20 shown in FIG. 1. For example, the system management server 20 performs an authentication process on accounts of a plurality of information processing apparatuses 10 that intend to perform video chatting, and the information processing apparatuses 10 are accordingly connected to one another in a state in which they can use the video chatting system.

Next, in Step S403, the display control section 142 controls display of the display screen of the display unit 120 so as to be in the first display state, in other words, to be in the state in which other content that is the first content (for example, a television program) is displayed and captured images of conversation partners of video chatting that are the second content are not displayed. In this manner, in the present embodiment, an initial state or a default state during use of the video chatting system may be the first display state.

Next, in Step S405, the trigger operation detection section 141 determines whether or not a trigger operation has been detected. FIG. 7 shows a case in which the trigger operation detection section 141 detects the watching operation as an example of the trigger operation. Note that, although FIG. 7 shows that the trigger operation detection section 141 detects the trigger operation for the first time in the stage of Step S405, in the present embodiment, in the process of Step S403 and thereafter, the operation information acquisition unit 110 acquires operation information of the user as necessary, and the trigger operation detection section 141 performs a process of detecting the trigger operation as necessary.

When the watching operation is not detected in Step S405, the process returns to Step S403, and the state of the display screen is maintained as the first display state. Note that the user and the conversation partner may talk with each other using their voices in the state of the display screen of the first display state until the trigger operation is detected. On the other hand, when the watching operation is detected in Step S405, the process proceeds to Step S407.

In Step S407, communication with the information processing apparatus 10 of the conversation partner is performed via the communication unit 130. To be specific, the information processing apparatus 10 of the user transmits a response request for transmission and reception of video information and/or voice information of video chatting to the information processing apparatus 10 of the conversation partner. When, in the state indicated by Step S403, the user and the conversation partner talk with each other using their voices in the state of the display screen of the first display state, the transmission and reception of the voice information have already been executed, and thus the information processing apparatus 10 of the user may transmit the response request for the transmission and reception of the video information to the information processing apparatus 10 of the conversation partner. When the conversation partner permits the video information and/or the voice information to be transmitted and received, the conversation partner can reply (respond) to the information processing apparatus 10 of the user to that effect.

Next, in Step S409, presence or absence of a response from the conversation partner to the response request in Step S407 is determined. When the conversation partner refuses to perform transmission and reception of the video information and/or the voice information for some reason, the conversation partner can reply to the information processing apparatus 10 of the user to that effect. When a response of refusing the transmission and reception is made, or when the conversation partner fails to make a response because the conversation partner is not near the information processing apparatus 10 (e.g., has left his or her seat), or the like, the process returns to Step S403, and the state of the display screen is maintained as the first display state. When the user wants to perform transmission and reception of the video information and/or the voice information with the conversation partner, the user performs the watching operation again, and presence or absence of the operation is detected again in Step S405.

When there is a response from the conversation partner in Step S409 that transmission and reception of the video information and/or the voice information is permitted, the process proceeds to Step S411. In Step S411, the display control section 142 controls the state of the display screen so as to be the second display state. In other words, the state of the display screen is switched from the first display state in which the first content is displayed and the second content (the captured image of the conversation partner) is not displayed to the second display state in which the first content and the second content (the captured image of the conversation partner) are at least displayed. In the second display state, the display as illustrated in FIG. 3B, for example, may be displayed on the display screen. Note that, in switching from the first display state to the second display state in Step S411, the display of the display screen may be instantaneously changed from the first display state to the second display state in which the second content is displayed in a predetermined region within the display screen, or may be changed from the first display state to the second display state such that the second content is gradually inserted onto the display screen. While continuing viewing of the first content, the user can perform video chatting with reference to the captured image of the conversation partner that is the second content. In addition, display of the second content may be controlled according to a watching amount in the watching operation in the second display state as described in <1. Configuration of a display control system and an information processing apparatus> above.

Next, in Step S413, it is determined whether or not there has been another instruction of display switching. The instruction of display switching mentioned in Step S413 means an instruction of switching (returning) the display state to the first display state from the second display state. In the present embodiment, the instruction of display switching for switching the display state to the first display state from the second display state can be appropriately set by the user. An instruction input for returning the display state to the first display state from the second display state may be performed through a trigger operation of "stopping the watching operation" or may be performed through another different trigger operation. Alternatively, the instruction input may be performed using an operation input by an input device attached to the information processing apparatus 10 such as a remote controller. When there is no instruction of display switching, the process returns to Step S411, and the state of the display screen is maintained as the second display state. On the other hand, when there is the instruction of display switching, the process returns to Step S403, the display control section 142 accordingly controls the state of the display screen so as to be the first display state, and the series of processes including Step S403 and the succeeding steps are performed again.

When video chatting is finished, the information processing apparatus 10 of the user may be disconnected from the information processing apparatus 10 of the conversation partner by explicitly giving an instruction through an operation input from the user using the input device attached to the information processing apparatus 10 such as a remote controller. In addition, video chatting may be finished by detecting a predetermined movement (for example, a movement of shaking a hand toward the display screen or the like) made by the user. Alternatively, when the first content is a television program, video chatting may be automatically finished at a timing at which the television program ends or display is switched to another television program.

Hereinabove, the processing procedure of the display control method according to the embodiment of the present disclosure has been described with reference to FIG. 7. Note that, although the case in which there is one conversation partner in the video chatting system has been described above, the present embodiment is not limited to this case, and the user may perform video chatting with a plurality of conversation partners. When there are a plurality of conversation partners, for example, the response request and the response in Steps S407 and S409 are made to each of the conversation partners. In addition, in Step S411, only a captured image of a conversation partner who makes it response to permit transmission and reception of the video information and/or the voice information may be displayed on the display screen as the second content. Furthermore, when captured images of a plurality of different conversation partners are to be displayed on the display screen as the second content, for example, the display as illustrated in FIGS. 4A and 4B may be shown on the display screen.

Moreover, although the case in which the trigger operation is the watching operation has been described above, the present embodiment is not limited to this case. The trigger operation may be another operation, or can be appropriately set by the user.

In addition, although the case in which the first content and the second content are displayed on the display screen in the second display state has been described above, the present embodiment is not limited to this case. For example, a plurality of different pieces of content may be displayed on the display screen in the second display state as illustrated in FIG. 5. Furthermore, display of a plurality of different pieces of content may be controlled by a plurality of different trigger operations in the second display state.

In addition, in the present embodiment, the processes indicated by Steps S407 and S409 among the processes shown in the flowchart of FIG. 7 may be omitted. In other words, in the present embodiment, the display of the display screen may be unconditionally switched from the first display state to the second display state by detecting the trigger operation without exchanging the response request for transmission and reception of the video information and/or the voice information and a response thereto between the information processing apparatus 10 of the user and the information processing apparatus 10 of the conversation partner.

4. HARDWARE CONFIGURATION

Next, a hardware configuration of the information processing apparatus 10 according to an embodiment of the present disclosure will be described with reference to FIG. 8. FIG. 8 is a functional block diagram showing the hardware configuration of the information processing apparatus 10 according to the embodiment of the present disclosure.

The information processing apparatus 10 mainly includes a CPU 901, a ROM 903, and a RAM 905. In addition, the information processing apparatus 10 further includes a host bus 907, a bridge 909, an external bus 911, an interface 913, an imaging device 914, an input device 915, an output device 917, a storage device 919, a drive 921, a connection port 923, and a communication device 925.

The CPU 901 functions as an arithmetic operation processing device and a control device, and controls all or some of operations performed in the information processing apparatus 10 according to various kinds of programs recorded in the ROM 903, the RAM 905, the storage device 919, and a removable recording medium 927. The CPU 901 corresponds to, for example, the control unit 140 shown in FIG. 1 in the present embodiment, and performs processes on various kinds of information in the display control process according to the present embodiment. The ROM 903 stores programs that the CPU 901 uses, arithmetic operation parameters, and the like. The RAM 905 primarily stores programs that the CPU 901 uses, parameters that appropriately change in execution of the programs, and the like. The CPU 901, the ROM 903, and the RAM 905 are connected to one another by the host bus 907 configured by an internal bus such as a CPU bus.

The host bus 907 is connected to the external bus 911 such as a PCI (Peripheral Component Interconnect/Interface) bus via the bridge 909. In addition, the imaging device 914, the input device 915, the output device 917, the storage device 919, the drive 921, the connection port 923, and the communication device 925 are connected to the external bus 911 via the interface 913.

The imaging device 914 is an imaging part such as a camera that photographs imaging targets in the form of a moving image or a still image. To be specific, the imaging device 914 has a plurality of light-sensing elements arrayed in a two-dimensional shape, can acquire image signals expressing images of photographing targets by performing photoelectric conversion using the light-sensing elements, and can generate still images and moving images of the photographing targets by performing various kinds of signal processes on the image signals. The imaging device 914 corresponds to, for example, the imaging section 111 shown in FIG. 1 in the present embodiment, and acquires captured images for acquiring operation information of users. In addition, information of the captured image photographed by the imaging section 111 can be used as video information in video chatting.

The input device 915 is an operation part which users operate, for example, a mouse, a keyboard, a touch panel, a button, a switch, a lever, and the like. In addition, the input device 915 may be, for example, a remote controlling part (so-called remote controller) that uses infrared rays or other radio waves, of may be externally connected device 929 such as a mobile telephone or a PDA corresponding to operations of the information processing apparatus 10. Furthermore, the input device 915 is configured as, for example, an input control circuit that generates input signals based on, for example, information input by a user using the operation part described above and outputs the signals to the CPU 901. A user of the information processing apparatus 10 can input various kinds of data or instruct the information processing apparatus 10 on processing operations by operating the input device 915. In the present embodiment, for example, the user can input various kinds of instructions and information relating to the display control process (for example, setting of the trigger operation, selection of a connection destination in video chatting, or the like) using operation inputs via the input device 915.

The output device 917 is configured as a device that can inform users of acquired information in a visual or auditory manner. As such a device, there are display devices including a CRT display device, a liquid crystal display device, a plasma display device, an EL display device, and a lamp, audio output devices including a speaker, and a headphone, a printing device, and the like. The output device 917 outputs, for example, results obtained from various kinds of processes performed by the information processing apparatus 10. To be specific, a display device displays results obtained from various kinds of processes performed by the information processing apparatus 10 in various forms of text, a graph, an image, and the like. The display device corresponds to, for example, the display unit 120 shown in FIG. 1 in the present embodiment, and displays all kinds of content including the first content and the second content according to control by the display control section 142. On the other hand, an audio output device converts audio signals that include reproduced voice data, acoustic data, and the like into analog signals and outputs the signals. The audio output device outputs, for example, a voice of the conversation partner based on voice information in video chatting.

The storage device 919 is a device for data storage configured as an example of a storage unit of the information processing apparatus 10. The storage device 919 is configured by, for example, a magnetic storage device such an HDD (Hard Disk Drive), a semiconductor storage device, an optical storage device, or a magneto-optical storage device. The storage device 919 stores programs executed by the CPU 901, various kinds of data, various kinds of data acquired from outside, and the like. In the present embodiment, the storage device 919 can store various kinds of information processed in the display control process. In addition, the storage device 919 may store various kinds of information used in video chatting, for example, user account information, and the like.

The drive 921 is a reader/writer for recording media, and built in or externally connected to the information processing apparatus 10. The drive 921 reads information recorded on the removable recording medium 927 such as a magnetic disk, an optical disc, a magneto-optical disc, or a semiconductor memory loaded therein, and outputs the information to the RAM 905. In addition, the drive 921 can also write various kinds of information on the removable recording medium 927 such as a magnetic disk, an optical disc, a magneto-optical disc, or a semiconductor memory loaded therein. The removable recording medium 927 is, for example, a DVD medium, an HD-DVD medium, a Blu-ray (registered trademark) medium, or the like. Furthermore, the removable recording medium 927 may be a CompactFlash (CF) (registered trademark), a flash memory, an SD memory card. (Secure Digital memory card), or the like. Moreover, the removable recording medium 927 may be, for example, an IC card (Integrated Circuit card) on which a non-contact-type IC chip is mounted, an electronic device, or the like. In the present embodiment, the information processing apparatus 10 can read various kinds of information relating to the display control process from the removable recording medium 927 or write the information on the removable recording medium 927 via the drive 921.

The connection port 923 is a port for connecting other external devices directly to the information processing apparatus 10. As an example of the connection port 923, there is a USB (Universal Serial Bus) port, an IEEE 1394 port, an SCSI (Small Computer System Interface) port, or the like. As another example of the connection port 923, there is an RS-232C port, an optical audio terminal, an HDMI (High-Definition Multimedia Interface) (registered trademark) port, or the like. By connecting the externally connected device 929 to the connection port 923, the information processing apparatus 10 can acquire various kinds of information directly from the externally connected device 929, or provide various kinds of information to the externally connected device 929. In the present embodiment, the information processing apparatus 10 can acquire various kinds of information relating to the display control process from the externally connected device 929 or output such information to the externally connected device 929 via the connection port 923.

The communication device 925 is a communication interface configured by a communication device or the like to be connected to, for example, a communication network (network) 931. The communication device 925 is a communication card for, for example, a wired or wireless LAN (Local Area Network), Bluetooth (registered trademark), or a WUSB (Wireless USB). In addition, the communication device 925 may be a router for optical communication, a router for ADSL (Asymmetric Digital Subscriber Line), a modem for various kinds of communication, or the like. The communication device 925 can transmit and receive signals and the like based on a predetermined protocol, for example, TCP, IP, or the like with, for example, the Internet or other communication devices. Furthermore, the network 931 connected to the communication device 925 is configured by a network to which connection is made in a wired or wireless manner, and may be, for example, the Internet, a household LAN, infrared communication, radio wave communication, satellite communication, or the like. The communication device 925 corresponds to, for example, the communication unit 130 shown in FIG. 1 in the present embodiment. In addition, the network 931 corresponds to, for example, the network 30 shown in FIG. 1. In the present embodiment, the communication device 925 can transmit and receive various kinds of information relating to the display control process between another device connected thereto via the network 931. For example, the communication device 925 transmits and receives various kinds of information for using the video chatting system between the system management server 20 shown in FIG. 1. Furthermore, for example, the communication device 925 transmits and receives a response request for transmission and reception of video information and/or voice information in the video chatting system and a response to the response request between the information processing apparatus 10 of a conversation partner, and transmits and receives the video information and/or the voice information between the information processing apparatus 10 of the conversation partner when there is a response to permit the transmission and reception.

In addition, although not specified in FIG. 8, the information processing apparatus 10 may further include a distance-measuring sensor device that detects a distance to a user, or a sound-collecting device for acquiring sound around the apparatus. The distance-measuring sensor device or the sound-collecting device is provided in, for example, the operation information acquisition unit 110 shown in FIG. 1, and operation information may be acquired based on information of a distance to a user or information of a voice emitted from the user acquired by the devices. Furthermore, the information of the voice collected by the sound-collecting device can be used as voice information in video chatting.

Hereinabove, the example of the hardware configuration that can realize the functions of the information processing apparatus 10 according to an embodiment of the present disclosure has been introduced with reference to FIG. 8. The constituent elements described above may be configured using general-purpose members, or may be configured by software specified in the functions of the constituent elements. Thus, the hardware configuration to be used can be appropriately changed according to technical levels whenever the present embodiment is implemented.

Note that a computer program for realizing the functions of the information processing apparatus 10 according to the present embodiment as described above can be produced or installed in a personal computer of the like. In addition, a recording medium on which such a computer program is stored and which can be read by computers can also be provided. The recording medium is, for example, a magnetic disk, an optical disc, a magneto-optical disc, a flash memory, or the like. In addition, the computer program may be distributed via, for example, a network without using a recording medium.

5. CONCLUSION

As described hereinabove, the present embodiment can obtain the following effects.

In the present embodiment, the trigger operation detection section 141 detects a trigger operation that is a specific operation by a user performed with respect to the display screen based on operation information that is information of an operation performed by the user. In addition, the display control section 142 performs display control of switching the first display state in which the first content is displayed and the second content relating to the first content is not displayed on the display screen and the second display state in which the first content and the second content are at least displayed on the display screen according to the detected trigger operation. Thus, the switching between the first display state and the second display state can be easily performed through a user's simple operation, and thus user convenience is enhanced.

In addition, the display control process according to the present embodiment can be combined with use of the video chatting system. During use of the video chatting system, for example, the first content can be set to content other than a captured image of a conversation partner (for example, a television program or the like) in video chatting, and the second content can be set to the captured image of the conversation partner in the video chatting. By performing the trigger operation, the user can easily perform switching of the display screen according to his or her intention by setting the display screen to be in the first display state when, for example, he or she wants to stop talking with a conversation partner and to concentrate on viewing of other content, or by setting the display screen to be the second display state when he or she wants to talk with the conversation partner to exchange thoughts on details of the content. In addition, since switching between the first display state and the second display state is possible through a comparatively simple operation called a trigger operation, the user can perform video chatting without viewing of the first content being obstructed. Therefore, user convenience during use of video chatting is enhanced.

Furthermore, in the present embodiment, the trigger operation may include an operation relating to a line of sight of the user. To be specific, the trigger operation may be an operation of the user turning his or her line of sight to face a predetermined region within the display screen, or may be the watching operation. In addition, in the present embodiment, display control of gradually inserting the second content onto the display screen according to a watching amount of the watching operation may be performed. Thus, the user can easily adjust a ratio of a display region of the first content and a display region of the second content to the display screen in the second display state through a comparatively simple operation of moving his or her head and/or line of sight according to a situation. In this manner, in the present embodiment, the ratio of a display region of the first content and a display region of the second content to the display screen in the second display state can be controlled according to a position of the line of sight of the user. Therefore, a higher level of freedom for the user is realized in the display control process.

Hereinabove, exemplary embodiments of the present disclosure have been described in detail with reference to the accompanying drawings, however, the technical scope of the present disclosure is not limited to the embodiment. It should be understood by those skilled in the art that various modifications, combinations, sub-combinations and alterations may occur depending on design requirements and other factors insofar as they are within the scope of the appended claims or the equivalents thereof.

For example, although the case in which the operation information acquisition unit 110 of the information processing apparatus 10 has the imaging section 111 and the trigger operation is an operation caused by a motion of the user has been described above, the present embodiment is not limited to the example. For example, the operation information acquisition unit 110 may be configured to have a sound-collecting device such as a microphone device and the trigger operation detection section 141 to have a voice recognition function, and an operation of emitting a voice including a specific word by a user may be detected as a trigger operation. In addition, by combining an operation of making a specific motion and an operation of emitting a voice including a specific word, an operation of making the specific motion and emitting a specific word may be set as a trigger operation.

Furthermore, although the display control process performed during use of the video chatting system has been described above, the present embodiment is not limited to this example. The display control process according to the present embodiment can also be applied when other applications or systems are used as long as at least two different pieces of content can be displayed on a display screen. In addition, the kinds of the first content, the second content, and other content that can be displayed on the display screen are not limited in the display control process according to the present embodiment, and display of all kinds of content may be controlled.

Additionally, the present technology may also be configured as below.

(1) An information processing apparatus including: a control device to control switching between a first display state and a second display state according to a trigger operation that is a specific operation of a user, wherein the trigger operation is based on operation information indicating an operation performed by the user.

(2) The apparatus according to (1),
wherein the trigger operation includes at least one of a watching operation, an operation relating to line of sight or an operation of stopping the trigger operation.

(3) The apparatus according to (1) or (2),
wherein the watching operation is based on information of movement of the user.

(4) The apparatus according to any of (1) to (3),
wherein the movement of the user indicates change in direction of line of sight of the user.

(5) The apparatus according to any of (1) to (4),
wherein, when the trigger operation is detected, the control device controls communication with an external device of another user.

(6) The apparatus according to any of (1) to (5),
wherein the communication includes at one of a video, audio or text.

(7) The apparatus according to any of (1) to (6),
wherein the video is part of a video chat.

(8) The apparatus according to any of (1) to (7),
wherein in the first display state first content is displayed and second content relating to the first content is not displayed, and in the second display state the first content and the second content are displayed.

(9) The apparatus according to any of (1) to (8),
wherein, in the second display state, display is three-dimensional.

(10) The apparatus according to any of (1) to (9), wherein, when switching from the first display state to the second display state, the second content is gradually inserted onto a display screen.

(11) The apparatus according to any of (1) to (10). wherein, in the second display state, the first content and the second content are displayed in different regions of a display screen.

(12) The apparatus according to any of (1) to (11), wherein, in the second display state, other content than the first content and the second content is displayed simultaneously with the first content and the second content.

(13) The apparatus according to any of (1) to (12), wherein, in the second state, a ratio of a display region of the first content and a display region of the second content to a display screen is controllable.

(14) The apparatus according to any of (1) to (13), wherein the operation performed by the user is with respect to a display screen.

(15) The apparatus according to any of (1) to (14), wherein the operation performed by the user is with respect to a predetermined region within the display screen.

(16) The apparatus according to any of (1) to (15), wherein the operation performed by the user is movement of a part of a body of the user with respect to a display screen.

(17) An information processing method including:
controlling, by a control device, switching between a first display state and a second display state according to a trigger operation that is a specific operation of a user, wherein the trigger operation is based on operation information indicating an operation performed by the user.

(18) A non-transitory recording medium recorded with a program executable by a computer, the program including:
controlling switching between a first display state and a second display state according to a trigger operation that is a specific operation of a user, wherein the trigger operation is based on operation information indicating an operation performed by the user.

(19) An information processing apparatus including:
a trigger operation detection section configured to detect a trigger operation that is a specific operation of a user performed with respect to a display screen based on operation information that is information of an operation performed by the user, and a display control section configured to perform switching between a first display state in which first content is displayed and second content relating to the first content is not displayed on the display screen and a second display state in which the first content and the second content are at least displayed on the display screen, according to the trigger operation detected by the trigger operation detection section.

(20) The information processing apparatus according to (19), wherein the trigger operation detection section detects an operation of a user turning a line of sight of the user to a predetermined region within the display screen as the trigger operation.

(21) The information processing apparatus according to (19) or (20), wherein the trigger operation is a watching operation of the user turning a line of sight of the user in a direction of at least one side of the display screen and watching a space of the display screen corresponding to depth of the direction of the line of sight of the user.

(22) The information processing apparatus according to (21), wherein the display control section performs switching from the first display state to the second display state by inserting the second content onto the display screen in a direction in which the user watches the display screen in the watching operation.

(23) The information processing apparatus according to (21) or (22), wherein the trigger operation detection section detects the watching operation based on information of a motion of at least one of a head or the line of sight of the user included in the operation information.

(24) The information processing apparatus according to (23), wherein the display control section gradually inserts the second content onto the display screen according to a movement amount of a motion of at least one of the head or the line of sight of the user in the watching operation.

(25) The information processing apparatus according to any one of (21) to (24), wherein the display control section causes the second content to be displayed on the display screen in the second display state as a three-dimensional image reflecting depth of the display screen in the direction of the line of sight of the user in the watching operation.

(26) The information processing apparatus according to (25), wherein the display control section causes an angle of the three-dimensional image of the second content and display of a position of the three-dimensional image of the second content in the depth direction to be changed in the second display state according to a movement amount of a motion of at least one of the head or the line of sight of the user in the watching operation.

(27) The information processing apparatus according to (19) or (20), wherein the trigger operation is an operation of the user moving at least a part of a body of the user in a first direction with respect to the display screen.

(28) The information processing apparatus according to (27), wherein the display control section performs switching from the first display state to the second display state by gradually inserting the second content onto the display screen in the first direction according to a movement amount of at least a part of the body of the user in the first direction in the trigger operation.

(29) The information processing apparatus according to any one of (19) to (28), wherein the display control section causes the first content and the second content to be displayed in different regions within the display screen in the second display state.

(30) The information processing apparatus according to any one of (19) to (29), wherein the display control section causes other content to be further displayed on the display screen in the second display state in addition to the first content and the second content.

(31) The information processing apparatus according to (30),
wherein the trigger operation detection section detects, as the trigger operation, each of respective operations of the user moving at least a part of a body of the user in a plurality of different directions with respect to the display screen, and wherein the display control section performs switching from the first display state to the second display state by respectively inserting the second content and the other content onto the display screen in the directions in which the user moves at least the part of the body of the user in the trigger operation in the second display state.

(32) The information processing apparatus according to any one of (19) to (31), wherein, in a video chatting system in which the user and at least one or more conversation partners at least transmit and receive captured images in which the user and the conversation partners are photographed and voices emitted by the user and the conversation partners with each other via the information processing apparatuses, the second content is the captured images of the conversation partners.

(33) The information processing apparatus according to (32), wherein the display control section causes the captured images of the plurality of different conversation partners to be displayed on the display screen in the second display state.

(34) The information processing apparatus according to (33), wherein the display control section corrects imbalance of the captured images including at least one of deviation of orientations of the captured images with respect to the display screen or deviation of positions of the captured images in a display region, and causes the captured images of which imbalance has been corrected to be displayed on the display screen as the second content in the second display state.

(35) The information processing apparatus according to any one of (19) to (34), further including:

an operation information acquisition unit configured to acquire the operation information, wherein the operation information acquisition unit includes an imaging section configured to photograph an image of an imaging target and acquires the operation information by acquiring information of a motion of at least a part of the body of the user based on a captured image photographed by the imaging section, and wherein the trigger operation detection section detects the trigger operation based on the information of the motion of at least the part of the body of the user included in the operation information acquired by the operation information acquisition unit.

(36) The information processing apparatus according to (35), wherein the trigger operation is an operation of the user turning a line of sight of the user in the direction of at least one side of the display screen and watching a space corresponding to an external part of the display screen from the display screen, and wherein the imaging section is disposed in a position corresponding to a direction of the line of sight of the user in the watching operation.

(37) A display control method including:

detecting a trigger operation that is a specific operation of a user performed with respect to a display screen based on operation information that is information of an operation performed by the user; and performing switching between a first display state in which first content is displayed and second content relating to the first content is not displayed on the display screen and a second display state in which the first content and the second content are at least displayed on the display screen, according to the detected trigger operation.

(38) A program for causing a computer to realize:

a function of detecting a trigger operation that is a specific operation of a user performed with respect to a display screen based on operation information that is information of an operation performed by the user; and a function of performing switching between a first display state in which first content is displayed and second content relating to the first content is not displayed on the display screen and a second display state in which the first content and the second content are at least displayed on the display screen, according to the detected trigger operation.

REFERENCE SIGNS LIST 1 display control system
10 information processing apparatus
20 system management server
30 network
110 operation information acquisition unit
111 imaging section
120 display unit
130 communication unit
140 control unit
141 trigger operation detection section
142 display control section

The invention claimed is:

1. An information processing apparatus comprising:
a control device to control display of a first display state or a second display state on a display device and to control switching between the first display state and the second display state according to a trigger operation that is a specific operation of a user when communicating with an external device of another user, wherein the trigger operation is based on operation information indicating an operation performed by the user,
in the first display state, first content is displayed in a two-dimensional manner and second content which includes a captured image of the another user is not displayed, and
in the second display state, the first content and the second content are displayed in a three-dimensional manner such that a three-dimensional or isometric view of an image is displayed in which the first content appears to be displayed on a first face of the displayed three-dimensional image and the captured image of the another user appears to be displayed on another face of the displayed three-dimensional image,
wherein in the second display state the first content and the captured image of another user are displayed in a three-dimensional manner, and wherein display of the first content in a two-dimensional image is changed to display of the first content and the captured image of another user in the three-dimensional image in response to a change in an angle between the display device and the line of sight of the user.

2. The apparatus of claim 1, wherein the trigger operation includes at least one of a watching operation, an operation relating to line of sight or an operation of stopping the trigger operation.

3. The apparatus of claim 2, wherein the watching operation is based on information of movement of the user.

4. The apparatus of claim 3, wherein the movement of the user indicates change in direction of line of sight of the user.

5. The apparatus of claim 1, wherein the communicating with the external device includes at one of a video, audio or text.

6. The apparatus of claim 5, wherein the video is part of a video chat.

7. The apparatus of claim 1, wherein, when switching from the first display state to the second display state, the second content is gradually inserted onto a display screen.

8. The apparatus of claim 1, wherein, in the second display state, other content than the first content and the second content is displayed simultaneously with the first content and the second content.

9. The apparatus of claim 1, wherein the operation performed by the user is with respect to a display screen on the display device.

10. The apparatus of claim 9, wherein the operation performed by the user is with respect to a predetermined region within the display screen.

11. The apparatus of claim 1, wherein the operation performed by the user is movement of a part of a body of the user with respect to a display screen on the display device.

12. An information processing method comprising:
controlling, by a control device, displaying of a first display state or a second display state on a display device and switching between the first display state and the second display state according to a trigger operation that is a specific operation of a user when communicating with an external device of another user, wherein the trigger operation is based on operation information indicating an operation performed by the user,
in the first display state, first content is displayed in a two-dimensional manner and second content which includes a captured image of the another user is not displayed, and
in the second display state, the first content and the second content are displayed in a three-dimensional manner such that a three-dimensional or isometric view of an image is displayed in which the first content appears to be displayed on a first face of the displayed three-dimensional image and the captured image of the another user appears to be displayed on another face of the displayed three-dimensional image,
wherein in the second display state the first content and the captured image of another user are displayed in a three-dimensional manner, and wherein display of the first content in a two-dimensional image is changed to display of the first content and the captured image of another user in the three-dimensional image in response to a change in an angle between the display device and the line of sight of the user.

13. A non-transitory recording medium recorded with a program executable by a computer, the program comprising:
controlling displaying of a first display state or a second display state on a display device and controlling switching between the first display state and the second display state according to a trigger operation that is a specific operation of a user when communicating with an external device of another user, wherein the trigger operation is based on operation information indicating an operation performed by the user,
in the first display state, first content is displayed in a two-dimensional manner and second content which includes a captured image of the another user is not displayed, and
in the second display state, the first content and the second content are displayed in a three-dimensional manner such that a three-dimensional or isometric view of an image is displayed in which the first content appears to be displayed on a first face of the displayed three-dimensional image and the captured image of the another user appears to be displayed on another face of the displayed three-dimensional image,
wherein in the second display state the first content and the captured image of another user are displayed in a three-dimensional manner, and wherein display of the first content in a two-dimensional image is changed to display of the first content and the captured image of another user in the three-dimensional image in response to a change in an angle between the display device and the line of sight of the user.

\* \* \* \* \*